(12) United States Patent
Nelson et al.

(10) Patent No.: US 11,230,481 B2
(45) Date of Patent: *Jan. 25, 2022

(54) INSTALLATION FOR THE PREPARATION OF AN AQUEOUS SOLUTION COMPRISING AT LEAST ONE EARTH ALKALI HYDROGEN CARBONATE

(71) Applicant: Omya International AG, Oftringen (CH)

(72) Inventors: Nicholas Charles Nelson, Zürich (CH); Herbert Riepl, Gödersdorf (AT); Wolfgang Kreuger, Feistritz/Rosental (AT)

(73) Assignee: OMYA INTERNATIONAL AG, Oftringen (CH)

( * ) Notice: Subject to any disclaimer, the term of this patent is extended or adjusted under 35 U.S.C. 154(b) by 193 days.

This patent is subject to a terminal disclaimer.

(21) Appl. No.: 16/068,838

(22) PCT Filed: Feb. 3, 2017

(86) PCT No.: PCT/EP2017/052439
§ 371 (c)(1),
(2) Date: Jul. 9, 2018

(87) PCT Pub. No.: WO2017/134254
PCT Pub. Date: Aug. 10, 2017

(65) Prior Publication Data
US 2019/0047885 A1    Feb. 14, 2019

Related U.S. Application Data

(60) Provisional application No. 62/294,572, filed on Feb. 12, 2016.

(30) Foreign Application Priority Data

Feb. 5, 2016    (EP) .................................. 16154570

(51) Int. Cl.
*C02F 1/68* (2006.01)
*C02F 1/66* (2006.01)
(Continued)

(52) U.S. Cl.
CPC ................ *C02F 1/685* (2013.01); *A23L 2/54* (2013.01); *C02F 1/444* (2013.01); *C02F 1/66* (2013.01);
(Continued)

(58) Field of Classification Search
CPC .... A23L 2/54; C02F 1/44; C02F 1/444; C02F 1/66; C02F 1/68; C02F 1/685;
(Continued)

(56) References Cited

U.S. PATENT DOCUMENTS

| | | |
|---|---|---|
| 2,390,095 A | 12/1945 | Gloss |
| 5,346,627 A | 9/1994 | Siefert et al. |

(Continued)

FOREIGN PATENT DOCUMENTS

| | | |
|---|---|---|
| CN | 102826689 A | 12/2012 |
| CN | 105246838 A | 1/2016 |

(Continued)

OTHER PUBLICATIONS

International Search Report dated Mar. 13, 2017 from PCT/EP2017/052439.

(Continued)

*Primary Examiner* — Dirk R Bass
(74) *Attorney, Agent, or Firm* — Fay Sharpe LLP

(57) ABSTRACT

The present invention relates to an installation for the preparation of an aqueous solution comprising at least one earth alkali hydrogen carbonate, the use of the installation for the preparation of an aqueous solution comprising at least one earth alkali hydrogen carbonate as well as the use (Continued)

of the installation for the mineralization and/or stabilization of water.

19 Claims, 13 Drawing Sheets

(51) Int. Cl.
 *C02F 1/44* (2006.01)
 *A23L 2/54* (2006.01)
(52) U.S. Cl.
 CPC .................. *C02F 1/68* (2013.01); *C02F 1/44* (2013.01); *C02F 2209/03* (2013.01); *C02F 2209/06* (2013.01); *C02F 2209/11* (2013.01); *C02F 2209/24* (2013.01); *C02F 2209/40* (2013.01); *C02F 2209/42* (2013.01)
(58) Field of Classification Search
 CPC .............. C02F 2209/03; C02F 2209/06; C02F 2209/11; C02F 2209/24; C02F 2209/40; C02F 2209/42
 See application file for complete search history.

(56) References Cited

U.S. PATENT DOCUMENTS

| | | | |
|---|---|---|---|
| 5,914,046 | A | 6/1999 | Watten |
| 6,027,649 | A | 2/2000 | Benedek et al. |
| 7,374,694 | B2 | 5/2008 | Gaudinot et al. |
| 7,771,599 | B1 | 8/2010 | Choi et al. |
| 2001/0027950 | A1 | 10/2001 | Rabie et al. |
| 2004/0020410 | A1 | 2/2004 | Gane et al. |
| 2009/0101573 | A1 | 4/2009 | Yamasaki et al. |
| 2010/0224541 | A1 | 9/2010 | Takabatake et al. |
| 2013/0064741 | A1* | 3/2013 | Kim ........................ C01B 32/60 422/617 |
| 2014/0360940 | A1 | 12/2014 | Buri et al. |
| 2015/0010458 | A1 | 1/2015 | Buri et al. |
| 2016/0130163 | A1* | 5/2016 | Poffet ........................ C02F 1/44 210/650 |

FOREIGN PATENT DOCUMENTS

| | | | |
|---|---|---|---|
| EP | 0 421 399 | A1 | 4/1991 |
| EP | 0 520 826 | A1 | 12/1992 |
| EP | 1 974 806 | A1 | 10/2008 |
| EP | 1 974 807 | A1 | 10/2008 |
| EP | 1 975 310 | B1 | 10/2008 |
| EP | 1 982 759 | B1 | 10/2008 |
| EP | 2 565 165 | A1 | 3/2013 |
| EP | 2 623 466 | A1 | 8/2013 |
| EP | 2 623 467 | A1 | 8/2013 |
| EP | 2 623 564 | A1 | 8/2013 |
| EP | 2623467 | A1 † | 8/2013 |
| EP | 2 805 923 | A1 | 11/2014 |
| EP | 2805923 | A1 † | 11/2014 |
| EP | 3 009 182 | A1 | 4/2016 |
| WO | 98/46533 | A1 | 10/1998 |
| WO | 00/39222 | A1 | 7/2000 |
| WO | 2004/083316 | A1 | 9/2004 |
| WO | 2006/128730 | A1 | 12/2006 |
| WO | 2008/030633 | A2 | 3/2008 |
| WO | 2008/030654 | A1 | 3/2008 |
| WO | 2010/023742 | A1 | 3/2010 |
| WO | 2012/020056 | A1 | 2/2012 |
| WO | 2012/113957 | A1 | 8/2012 |
| WO | 2013/014026 | A1 | 1/2013 |
| WO | 2013/113614 | A1 | 8/2013 |
| WO | 2013/132399 | A1 | 9/2013 |
| WO | 2014/187613 | A1 | 11/2014 |
| WO | 2014/187666 | A1 | 11/2014 |

OTHER PUBLICATIONS

Written Opinion of the International Searching Authority dated Mar. 13, 2017 from PCT/EP2017/052439.
Toray Industries, Inc., Submerged Membrane Module for MBR TORAY "MEMBRAY" "TMR140 Series" Instruction Manual, 60 pages.
BIO-CEL XL, "World's largest submerged BIO-CEL® MBR module for biological wastewater treatment", 2 pages.
Liu Cao, "Manual of Urban Wastewater Treatment and Recycling Process", Beijing, China, Environmental Science Press, pp. 111-112, Section 3.3.3.2 Microfiltration.
International Search Report dated Apr. 3, 2017 from PCT/EP2017/052370.
Written Opinion of the International Searching Authority dated Apr. 3, 2017 from PCT/EP2017/052370.

\* cited by examiner
† cited by third party

INSTALLATION FOR THE PREPARATION OF AN AQUEOUS SOLUTION COMPRISING AT LEAST ONE EARTH ALKALI HYDROGEN CARBONATE

CROSS-REFERENCE TO RELATED APPLICATIONS

This is a U.S. national phase of PCT Application No. PCT/EP2017/052439, filed Feb. 3, 2017, which claims priority to U.S. Provisional Application No. 62/294,572, filed Feb. 12, 2016 and European Application No. 16154570.2, filed Feb. 5, 2016.

The present invention relates to an installation for the preparation of an aqueous solution comprising at least one earth alkali hydrogen carbonate, the use of the installation for the preparation of an aqueous solution comprising at least one earth alkali hydrogen carbonate as well as the use of the installation for the mineralization and/or stabilization of water.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of sea water, brine, brackish waters, waste waters and contaminated effluent waters is gaining more and more importance for environmental and economic reasons.

In order to recover water from sea water or brackish water, for potable use, several installations and processes are known, which are of considerable importance for dry areas, coastal regions and marine islands, and such installations and processes usually comprise distillation, electrolytic as well as osmotic or reverse osmotic processes. The water obtained by such processes is very soft and has a low pH value because of the lack of pH-buffering salts, and thus, tends to be highly reactive and, unless treated, it can create severe corrosion difficulties during its distribution in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to increase the mineral and alkalinity content of the water.

Conventional processes and corresponding installations that are mainly used for the mineralization of water are lime addition and dissolution with partial carbonation by carbon dioxide and limestone bed filtration, also called calcite contactors. Other, less common mineralization processes, comprise, e.g., the addition of hydrated lime and sodium carbonate, the addition of calcium sulphate and sodium hydrogen carbonate, or the addition of calcium chloride and sodium hydrogen carbonate.

The lime process involves treatment of lime solution with $CO_2$ acidified water, wherein the following reaction is involved:

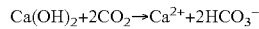

$$Ca(OH)_2 + 2CO_2 \rightarrow Ca^{2+} + 2HCO_3^-$$

As can be gathered from the above reaction scheme, two equivalents of $CO_2$ are necessary to convert one equivalent of $Ca(OH)_2$ into $Ca^{2+}$ and hydrogen carbonate for mineralization. This method is dependent on the addition of two equivalents of $CO_2$, in order to convert the alkaline hydroxide ions into the buffering species $HCO_3^-$. For the mineralization of water, a saturated calcium hydroxide solution, commonly named lime water, of 0.1-0.2 wt.-%, based on the total weight, is prepared from a lime milk (usually at most 5 wt.-%). Therefore, a saturator to produce the lime water must be used and large volumes of lime water are necessary to achieve the target level of mineral and alkalinity content. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing soft water through a bed of granular limestone dissolving the calcium carbonate in the water flow. Contacting limestone with $CO_2$ acidified water mineralises the water according to:

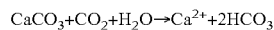

$$CaCO_3 + CO_2 + H_2O \rightarrow Ca^{2+} + 2HCO_3$$

Unlike the lime process, only one equivalent of $CO_2$ is stoichiometrically necessary to convert one equivalent of $CaCO_3$ into $Ca^{2+}$ and hydrogen carbonate for mineralization and alkalinity addition. Moreover, limestone is not corrosive and due to the buffering properties of $CaCO_3$ major pH shifts are prevented. However, as the pH increases the reaction slows down such that additional $CO_2$ has to be dosed in order to ensure enough $CaCO_3$ is dissolved. The unreacted $CO_2$ is then either removed through stripping or neutralization with sodium hydroxide.

Methods and systems for mineralization of water using lime milk or a slurry of lime are described in U.S. Pat. No. 7,374,694 and EP 0 520 826. U.S. Pat. No. 5,914,046, which describes a method for reducing the acidity in effluent discharges using a pulsed limestone bed.

U.S. Pat. No. 7,771,599 describes a method for the mineralization of process water in a desalination system. The method sequesters carbon dioxide gas from sea water or concentrate (brine) of the desalination process via a gas transfer membrane. The sequestered carbon dioxide gas is thereafter used in the production of soluble calcium hydrogen carbonate $(Ca(HCO_3)_2)$. WO 2012/020056 A1 is directed toward a process for mineralization of water comprising the steps of providing feed water, and injecting gaseous carbon dioxide and a slurry into the feed water, wherein the slurry comprises micronized calcium carbonate. WO 2010/023742 A2 describes a method and apparatus for producing potable water by post-processing (post-treating) desalinated water obtained by desalination of sea water through distillation or reverse osmosis. The method includes a carbon dioxide absorption process of excessively supplying carbon dioxide into the desalinated water to absorb the carbon dioxide, a mineralization process of passing the desalinated water into which carbon dioxide is absorbed through a limestone filter in which limestone is filled to form calcium ions and hydrogen carbonate ions, and a carbon dioxide exhaust process of supplying air into the desalinated water passed through the mineralization process to exhaust the carbon dioxide with the air to obtain the potable water. WO 2012/113957 A1 relates to a method for the remineralisation of fluids, in which final turbidity is controlled. The method includes steps comprising reagent dosing, remineralisation and filtration. EP 2565165 A1 refers to a process for mineralization of water comprising the steps of providing feed water, providing an aqueous solution of calcium carbonate, wherein the aqueous solution of calcium carbonate comprises dissolved calcium carbonate and reaction species thereof, and combining the feed water and the aqueous calcium carbonate solution. EP 2623466 A1 refers to a process for the preparation of an aqueous solution comprising at least one earth alkali hydrogen carbonate and its uses. The process may be carried out in a reactor system comprising a tank equipped with a stirrer, at least one filtering device and a grinding device. EP 2623467 A1 refers to a process for the preparation of an aqueous solution comprising at least one earth alkali hydrogen carbonate and its uses. The process is carried out in a reactor system that comprises a tank equipped with a stirrer and at least one filtering device. EP 2623564 A1 relates to an installation for the purification of minerals, pigments and/or fillers and/or the preparation of precipitated earth alkali carbonate and/or mineralization of water and to the use of such an installation for the purification of minerals, pigments and/or fillers and/or mineralization of water and/or the preparation of precipitated earth alkali carbonate. WO 2013/132399 A1 refers to water mineralization which is carried out by mixing carbonate in powder form in a fast process into the water, generating $CO_2$ in the water but adding turbidity to it. The treated water is then delivered through a reactor with granular carbonate, in which the $CO_2$ in the water dissolves additional carbonate in a slow process. The reactor acts simultaneously to add further minerals as well as alkalinity to the water, and to remove the turbidity out of the water by dissolving residual powder and filtering non-dissolvable particles. CN 102826689 A1 refers to a post-treatment process of desalted seawater, comprising the following steps of: (1) adding $CO_2$ into desalted seawater and mixing sufficiently; and (2) mineralizing the desalted seawater having added $CO_2$ in a mineralizing pool; arranging a calcium carbonate filter bed in the mineralizing pool; and enabling the desalted seawater with the added $CO_2$ to pass through the calcium carbonate filter bed to be contacted and reacted sufficiently with the calcium carbonate. WO 2013/014026 A1 concerns a process for treating water and the use of calcium carbonate in such a process. In particular, it is directed to a process for remineralization of water comprising the steps of (a) providing feed water having a concentration of carbon dioxide of at least 20 mg/l, preferably in a range of 25 to 100 mg/l, and more preferably in a range of 30 to 60 mg/l, (b) providing an aqueous slurry comprising micronized calcium carbonate, and (c) combining the feed water of step (a) and the aqueous slurry of step (b) in order to obtain remineralized water. WO 2014/187666 A1 refers to a multiple batch system for the preparation of a solution of calcium hydrogen carbonate and the use of such a dual batch system for the preparation of a solution of calcium hydrogen carbonate. WO 2014/187613 A1 relates to an installation for the preparation of a solution of calcium hydrogen carbonate and the use of such an installation for the continuous preparation of a solution of calcium hydrogen carbonate as well as the use of such an installation for the remineralization of water.

US 2009/0101573 A1 refers to a waste water treatment apparatus and method, a mineral mixing tank receives biologically treated water, sludge which is generated by biological treatment, and mineral sludge which contains calcium and so on from a settling tank. A mineral pump returns the sludge and the treated water from the mineral mixing tank to a raw water tank. An air-lift pump circulates treatment water between a reaeration tank having a semi-anaerobic section and a denitrification tank. During the circulation of the treatment water between the reaeration tank and the denitrification tank, the semi-anaerobic section alleviates the change of environment for microorganisms and thereby realizes the environment required to facilitate the propagation of the microorganisms. The air-lift pump permits agitation with low energy consumption even when the microorganisms are cultured up to a high concentration thereof. WO 2006/128730 A1 describes a process for treating a feed stream of an aqueous medium of a given composition, which comprises dissolved potentially scale-forming components, in a reverse osmosis (RO) system under given process conditions, providing a permeate stream and a stream of a retentate (concentrate) which comprises potentially scale-forming components at a concentration sufficiently high to cause scale formation in those parts of the RO system being in contact with said retentate in the absence of a scale inhibitor, in which process (a) the retentate is continuously monitored to detect the presence of particles of potentially scale-forming components in said retentate and a reading of one or more physical parameters of the retentate related to the presence of such particles is continuously recorded; (b) said recorded reading is continuously compared to measurement values for said one or more parameters of a retentate obtained from an aqueous medium of the same composition under the same process conditions which values have empirically been predetermined; and (c) an amount of scale inhibitor is added to the RO system upstream of the membrane once the recorded reading for the one or more parameters differs from said predetermined measurement values, said amount of scale inhibitor having been empirically predetermined to prevent scale formation under said conditions. WO 98/46533 A1 refers to a system of purifying water to remove at least one of natural organic matter, colour, turbidity, bacteria, cysts and oocysts, viruses, arsenic compounds and insoluble impurities. The system comprises the steps of providing a body of water to be purified; controlling the pH of the body in a range of 5 to 8; and adding a coagulant to the body to provide a floc. The floc is maintained in the body in a concentration in the range of 1 to 6, for purposes of adsorbing at least one of the natural organic matter, colour, turbidity and bacteria to provide treated water. Thereafter, a first portion of the treated water and floc is removed from the body of water. U.S. Pat. No. 6,027,649 A refers to system of purifying water to remove at least one of natural organic matter, colour, turbidity, bacteria, cysts and oocysts, viruses, arsenic compounds and insoluble impurities. The system comprises the steps of providing a body of water to be purified; controlling the pH of the body in a range of 5 to 8; and adding a coagulant to the body to provide a floc. The floc is maintained in the body in a concentration in the range of 1 to 6, for purposes of adsorbing at least one of the natural organic matter, colour, turbidity and bacteria to provide treated water. Thereafter, a first portion of the treated water and floc is removed from the body of water. A submerged semi-permeable membrane is provided in the body of water for removing a second portion of the treated water. The membrane has a pore size in the range of 0.02 to 1 μm to provide a permeate comprised of purified water and to provide a retentate containing the floc. The body of water is treated by a means of mixing to minimize membrane fouling and to provide thorough mixing of the floc in the body of water. US 2010/0224541 A1 describes a fine bubble diffusing tube that can generate fine bubbles evenly and uniformly even when the diffusing tube has a long length, a fine bubble diffusing device using such a tube and a submerged membrane separation apparatus are produced. US 2013/0064741 A1 relates to a system for fixing carbon dioxide. The system comprises a first reactor for extracting alkali metal components from a slag and a second reactor for carbonating the extracted alkali metal component with carbon dioxide. With this system, carbon dioxide can be fixed in a simpler and cost-effective manner.

However, the installations described in the prior art have the disadvantage that the mineralization and/or stabilization of water and especially the preparation of an aqueous solution comprising at least one earth alkali hydrogen carbonate used for the mineralization of water show an improvable $CO_2$ efficiency and/or an excessive energy consumption.

In view of the foregoing, improving the mineralization and/or stabilization of water still remains of interest to the skilled man. It would be especially desirable to provide an alternative or improved installation for the preparation of an aqueous solution comprising at least one earth alkali hydrogen carbonate which can be prepared in a more efficient, economic and ecologic way, especially enabling an increase in the efficiency of $CO_2$ consumption for the installation or the process carried out therein, and without excessive energy consumption for the installation and corresponding process.

It is thus an object of the present invention to provide an installation for the preparation of an aqueous solution comprising at least one earth alkali hydrogen carbonate. Another object may also be seen in the provision of an installation for the preparation of an aqueous solution comprising at least one earth alkali hydrogen carbonate that increases the efficiency of $CO_2$ consumption for the installation or the process carried out therein. A further object may be seen in the provision of an installation for the preparation of an aqueous solution comprising at least one earth alkali hydrogen carbonate enabling a decrease in overall energy consumption for the installation and corresponding process. Another object may be seen in the provision of an installation for the preparation of an aqueous solution comprising at least one earth alkali hydrogen carbonate in which the sludge production is decreased compared to a typical lime system of the prior art.

One or more of the foregoing and other problems are solved by the subject-matter as defined herein in the independent claims. Advantageous embodiments of the present invention are defined in the corresponding sub-claims.

A first aspect of the present invention relates to an installation for the preparation of an aqueous solution comprising at least one earth alkali hydrogen carbonate. The installation comprising a) a process flow line providing water,
b) at least one dosing unit being suitable for dosing at least one earth alkali carbonate-comprising material into at least a part of the water provided in the process flow line for obtaining an aqueous suspension comprising at least one earth alkali carbonate-comprising material,
c) at least one means being suitable for dosing $CO_2$ or an acid having a $pK_a$-value<5 into at least a part of the water provided in the process flow line or the aqueous suspension comprising at least one earth alkali carbonate-comprising material for obtaining an aqueous suspension S1 comprising at least one earth alkali hydrogen carbonate, and
d) a container being connected to the at least one process flow line by an inlet, wherein the container
   i) is configured such that at least one submerged membrane module is located in the container for filtering at least a part of the aqueous suspension S1 by passing the aqueous suspension S1 through the least one submerged membrane module in order to obtain an aqueous solution S2 comprising at least one earth alkali hydrogen carbonate, and
   ii) comprises at least one outlet for releasing the aqueous solution S2 comprising at least one earth alkali hydrogen carbonate from the container.

According to a further aspect of the present invention, the use of the installation, as defined herein, for the preparation of an aqueous solution comprising at least one earth alkali hydrogen carbonate is provided.

According to another aspect of the present invention, the use of the installation, as defined herein, for the mineralization and/or stabilization of water is provided.

According to one embodiment of the present installation, the at least one dosing unit is i) connected to a storage container for solid material, and/or ii) configured such that the at least one earth alkali carbonate-comprising material is directly dosed into the water provided in the process flow line, or iii) connected to a vessel suitable for preparing an aqueous suspension comprising at least one earth alkali carbonate-comprising material, wherein the vessel is connected to the process flow line by an inlet for introducing the water provided in the process flow line and an outlet for releasing the aqueous suspension comprising at least one earth alkali carbonate-comprising material, or iv) connected to the container.

According to another embodiment of the present installation, the container is a reactor tank, preferably a sealed reactor tank.

According to yet another embodiment of the present installation, the container comprises recirculating means which are configured such that air or process fluid is recirculated across at least a part of the surface of the at least one submerged membrane module from the bottom to top direction of the at least one submerged membrane module and/or the container.

According to one embodiment of the present installation, the at least one means c) is i) configured such that the $CO_2$ or acid having a $pK_a$-value<5 is directly dosed into the water provided in the process flow line, or ii) connected to a vessel suitable for preparing an aqueous suspension S1 comprising at least one earth alkali hydrogen carbonate, wherein the vessel is connected to the process flow line by an inlet for introducing the water provided in the process flow line and an outlet for releasing the aqueous suspension S1 comprising at least one earth alkali hydrogen carbonate, or iii) connected to the container, preferably to the recirculating means suitable for recirculating air or process fluid across at least a part of the surface of the at least one submerged membrane module from the bottom to top direction of the at least one submerged membrane module and/or the container.

According to another embodiment of the present installation, wherein the at least one submerged membrane module a) has a pore size of <1 µm, and more preferably <0.1 µm, e.g. from 0.04 to 0.9 µm such as about 0.04 µm or 0.08 µm, and/or b) has a flux of ≥10 l/(m²h), preferably in the range from 50 to 150 l/(m²h), and most preferably in the range from 80 to 150 l/(m²h), and/or c) is of a ceramic, polymer, or other synthetic material.

According to yet another embodiment of the present installation, the at least one process flow line comprises one or more main process flow line(s).

According to one embodiment of the present installation, the at least one process flow line comprises two main process flow lines, preferably a main branch of the main process flow line and a side branch of the main process flow line.

According to another embodiment of the present installation, the at least one dosing unit is located in the side branch of the main process flow line.

According to yet another embodiment of the present installation, the main branch of the main process flow line and the side branch of the main process flow line are configured such that they are merged together upstream of the container.

According to one embodiment of the present installation, the at least one process flow line comprises one main process flow line and one or more side process flow line(s), preferably one main process flow line and one or two side process flow line(s).

According to another embodiment of the present installation, the at least one process flow line comprises one main process flow line and two side process flow lines, preferably a main branch of the side process flow line and a side branch of the side process flow line.

According to yet another embodiment of the present installation, the at least one dosing unit is located in the side process flow line or, if present, in the side branch of the side process flow line.

According to one embodiment of the present installation, the main branch of the side process flow line and the side branch of the side process flow line are configured such that they are merged together upstream of the container.

According to another embodiment of the present installation, the main process flow line and the side process flow line are configured such that they are merged together downstream of the container.

According to yet another embodiment of the present installation, the installation comprises base dosing means downstream of the container for introducing a base to the aqueous solution S2 comprising at least one earth alkali hydrogen carbonate.

According to one embodiment of the present installation, the installation comprises base dosing means for introducing a base to the main process flow line downstream of where the side process flow line and main process flow line are merged together, preferably for introducing a base to the mixture of the aqueous solution S2 comprising at least one earth alkali hydrogen carbonate together with the water in the main process flow line.

It should be understood that for the purpose of the present invention the following terms have the following meaning.

The term "earth alkali carbonate-comprising material" may refer to a material that comprises at least 50.0 wt.-% earth alkali carbonate, based on the total dry weight of the earth alkali carbonate-comprising material.

A "calcium carbonate-comprising material" in the meaning of the present invention refers to a material which is a source of calcium carbonate and preferably is selected from ground calcium carbonate, precipitated calcium carbonate, surface-reacted calcium carbonate, dolomite and mixtures thereof.

The term "mineralization" as used in the present invention refers to the increase of both essential mineral ions and alkalinity in water that is not containing minerals or alkalinity at all, or in insufficient amounts such that the water is palatable. A mineralization can be achieved by adding at least the specific earth alkali carbonate, such as calcium carbonate, as raw material only to the water to be treated.

Optionally, e.g., for health-related benefits to ensure the appropriate intake of some essential minerals and trace elements, further substances such as magnesium salts can be mixed into or with the earth alkali carbonate, such as calcium carbonate, and then added to the water during the mineralization process. According to the national guidelines on human health and drinking water quality, the mineralised product can comprise additional minerals selected from the group comprising potassium or sodium, magnesium sulphate, potassium hydrogen carbonate, sodium hydrogen carbonate or other minerals containing essential trace elements and mixtures thereof. Preferably, the mineralised product comprises additional minerals selected from the group comprising magnesium sulphate, potassium hydrogen carbonate, sodium hydrogen carbonate and mixtures thereof.

The term "stabilization" as used in the present invention refers to the increase of the mineral content and alkalinity, to the neutralization or removal of remaining "aggressive" carbon dioxide and/or to the increase of the pH to achieve a stable and balanced final water quality. The stabilization is preferably achieved by stripping the aggressive carbon dioxide, adding a base to the mineralised water obtained by the inventive installation, or a combination of both.

The expression "$CO_2$ efficiency" in the meaning of the present invention refers to the ratio of $CO_2$ in the process carried out in the installation, both initially within the feed water provided in the process flow line and the additional $CO_2$ provided with the at least one means c) (measured in mmol/l), to the amount of earth alkali carbonate (provided with the at least one dosing means) that is converted into earth alkali hydrogen carbonate (measured in mmol/l) as the increase of earth alkali carbonate from the feed water provided in the process flow line to the aqueous solution S2 produced in the container of the inventive installation.

In the meaning of the present invention, the expressions "acidified" or "acid" refer to the Brønsted-Lowry theory, and thus refers to $H_3O^+$ ion-provider. Furthermore, the pH-value of an acid can be >7, such as in the range from >7 to 7.5, as long as a suitable corresponding base is available for accepting the $H_3O^+$ ion as donated by the acid.

For the purpose of the present application, the "$pK_a$-value" represents the acid dissociation constant associated with a given ionisable hydrogen in a given acid, and is indicative of the natural degree of dissociation of this hydrogen from this acid at equilibrium in water at a given temperature. Such $pK_a$ values may be found in reference textbooks such as Harris, D. C. "Quantitative Chemical Analysis: $3^{rd}$ Edition", 1991, W.H. Freeman & Co. (USA), ISBN 0-7167-2170-8. The $pK_a$-value can be determined according to methods of the prior art, which are well known to the skilled person. The $pK_a$-value of an acid is depending on the temperature, unless expressly stated otherwise the $pK_a$-values according to the present invention refer to a temperature of 25° C.

The term "downstream" in the meaning of the present invention refers to the succeeding position after another unit of the installation.

The term "upstream" in the meaning of the present invention refers to the preceding position before another unit of the installation.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The inventors of the present invention surprisingly found out that such an installation enables the skilled person to prepare an aqueous solution comprising at least one earth alkali hydrogen carbonate. The inventors of the present invention further surprisingly found out that such an installation increases the efficiency of $CO_2$ consumption for the installation or the process carried out therein. Furthermore, such an installation enables a decrease in overall energy consumption for the installation and corresponding process. In addition thereto, such an installation enables decreasing the sludge production, especially compared to a typical lime system of the prior art.

In the following, the details and preferred embodiments of the inventive installation for the preparation of an aqueous solution comprising at least one earth alkali hydrogen carbonate will be described in more detail. It is to be understood that these technical details and embodiments also apply to the inventive uses, as far as applicable.

Thus, the present invention provides an installation for the preparation of an aqueous solution comprising at least one earth alkali hydrogen carbonate, the installation comprising
  a) a process flow line providing water,
  b) at least one dosing unit being suitable for dosing at least one earth alkali carbonate-comprising material into at least a part of the water provided in the process flow line for obtaining an aqueous suspension comprising at least one earth alkali carbonate-comprising material,
  c) at least one means being suitable for dosing $CO_2$ or an acid having a $pK_a$-value<5 into at least a part of the water provided in the process flow line or the aqueous suspension comprising at least one earth alkali carbonate-comprising material for obtaining an aqueous suspension S1 comprising at least one earth alkali hydrogen carbonate, and
  d) a container being connected to the at least one process flow line by an inlet, wherein the container
    iii) is configured such that at least one submerged membrane module is located in the container for filtering at least a part of the aqueous suspension S1 by passing the aqueous suspension S1 through the least one submerged membrane module in order to obtain an aqueous solution S2 comprising at least one earth alkali hydrogen carbonate, and
    iv) comprises at least one outlet for releasing the aqueous solution S2 comprising at least one earth alkali hydrogen carbonate from the container.

The installation of the present invention is applicable to any process for the preparation of an aqueous solution comprising at least one earth alkali hydrogen carbonate. For example, the installation is applicable to the preparation of an aqueous solution comprising at least one earth alkali hydrogen carbonate which is suitable for the mineralization and/or stabilization of water.

The term "aqueous" solution refers to a system, wherein the aqueous solvent comprises, preferably consists of, water. However, said term does not exclude that the aqueous solvent comprises minor amounts of at least one water-miscible organic solvent selected from the group comprising methanol, ethanol, acetone, acetonitrile, tetrahydrofuran and mixtures thereof. Preferably, the aqueous solvent comprises water in an amount of at least 80.0 wt.-%, preferably at least 90.0 wt.-%, more preferably at least 95.0 wt.-%, even more preferably at least 99.0 wt.-%, based on the total weight of the aqueous solvent. For example, the aqueous solvent consists of water.

The term aqueous "solution" in the meaning of the present invention refers to a system comprising aqueous solvent and particles of earth alkali carbonate and/or earth alkali hydrogen carbonate, wherein the particles of the earth alkali carbonate and/or earth alkali hydrogen carbonate are dissolved in the aqueous solvent. The term "dissolved" in the meaning of the present invention refers to systems in which no discrete solid particles are observed in the aqueous solvent.

The term "at least one" earth alkali hydrogen carbonate in the meaning of the present invention means that the earth alkali hydrogen carbonate comprises, preferably consists of, one or more earth alkali hydrogen carbonate(s).

In one embodiment of the present invention, the at least one earth alkali hydrogen carbonate comprises, preferably consists of, one earth alkali hydrogen carbonate. Alternatively, the at least one earth alkali hydrogen carbonate comprises, preferably consists of, two or more earth alkali hydrogen carbonates. For example, the at least one earth alkali hydrogen carbonate comprises, preferably consists of, two earth alkali hydrogen carbonates.

Preferably, the at least one earth alkali hydrogen carbonate comprises, more preferably consists of, one earth alkali hydrogen carbonate.

In one embodiment of the present invention, the at least one earth alkali hydrogen carbonate is selected from the group consisting of calcium hydrogen carbonate, magnesium hydrogen carbonate and mixtures thereof. Preferably, the at least one earth alkali hydrogen carbonate comprises, preferably consists of, calcium hydrogen carbonate.

a): Process Flow Line Providing Water

According to a) of the inventive installation, the installation comprises a process flow line providing water.

It is appreciated that the process flow line is preferably formed by tubes, pipes and other such articles which are suitable for coupling the further units (e.g. the at least one dosing unit, at least one means c) and the container) of the installation to each other such that a fluid communication, i.e. a flow of fluid such as of a suspension from one unit of the inventive installation to another unit, between the units is achieved. The process flow line may be any kind of tubes, pipes and other such articles known to the skilled person and typically used for coupling units.

The water provided in the process flow line can be derived from various sources and can be selected from amongst distilled water, tap water, industrial water, desalinated water such as desalinated sea water, brackish water, treated wastewater, water treated via reverse osmosis, or naturally soft water such as ground water, surface water or rainfall. It can also contain between 10 and 2 000 mg/l NaCl. Preferably, the water provided in the process flow line is desalinated water, e.g. permeate or distillate obtained from a desalination process.

In one embodiment of the inventive installation, the water provided in the process flow line is water to be mineralised. That is to say, the water provided in the process flow line is water that does not contain minerals or alkalinity at all or in insufficient amounts.

The water provided in the process flow line can be pretreated. A pretreatment can be necessary, e.g., in case the water is derived from surface water, groundwater or rainwater. For example, to achieve the drinking water guidelines the water needs to be treated through the use of chemical or physical techniques in order to remove pollutants such as organics and undesirable minerals. For example, ozonising can be used as a first pretreatment step, followed then by coagulation, flocculation, or decantation as a second treatment step. For example, iron(III) salts such as $FeClSO_4$ or $FeCl_3$, or aluminium salts such as $AlCl_3$, $Al_2(SO_4)_3$ or polyaluminium can be used as flocculation agents. The flocculated materials can be removed from the water, e.g., by means of sand filters or multi-layered filters. Further water purification processes that can be used to pretreat the water are described, e.g., in EP 1 975 310, EP 1 982 759, EP 1 974 807, or EP 1 974 806.

If sea water or brackish water is provided in the process flow line, the sea water or brackish water is firstly pumped out of the sea by open ocean intakes or subsurface intakes such as wells, and then it undergoes physical pretreatments such as screening, sedimendation or sand removal processes. Depending on the required water quality, additional treatment steps such as coagulation and flocculation can be necessary in order to reduce potential fouling on the membranes. The pretreated sea water or brackish water can then be distilled, e.g., using multiple stage flash, multiple effect distillation, or membrane filtration such as nanofiltration or reverse osmosis, to remove the remaining particulates and dissolved substances.

It is to be noted that the water provided in the process flow line is preferably provided in one main process flow line (17) and in one or more side process flow line(s) (15).

That is to say, a part of the water provided in the process flow line is provided in the main process flow line (17) and the remaining part of the water in provided in the one or more side process flow line(s) (15). Thus, the main process flow line (17) and the one or more side process flow line(s) (15) are connected to each other, preferably in that the one or more side process flow line(s) (15) is/are connected to the main process flow line (17) by its inlet and outlet.

The process flow line preferably comprises one main process flow line (17) and one or more side process flow line(s) (15). More preferably, the at least one process flow line comprises one main process flow line (17) and one or two side process flow line(s) (15). For example, the at least one process flow line comprises one main process flow line (17) and one side process flow line (15).

A process flow line is considered as side process flow line (15) if the main process flow line (17) and the one or more side process flow line(s) (15) are merged together after the aqueous solution S2 is obtained in the container, preferably reactor tank (1).

Thus, the main process flow line (17) and the side process flow line (15) are preferably configured such that they are merged together downstream of the container.

If the process flow line comprises two or more side process flow lines (15), the two or more side process flow lines (15) can comprise a main branch of the side process flow line (15a) and one or more side branches of the side process flow line (15b). For example, two side process flow lines (15) comprise a main branch of the side process flow line (15a) and a side branch of the side process flow line (15b).

It is appreciated that the two or more side process flow lines (15) can be branched into a side branch of the side process flow line (15b) providing water for the preparation of the aqueous suspension comprising at least one earth alkali carbonate-comprising material or the aqueous suspension S1 and a main branch of the side process flow line (15a) providing water for diluting the aqueous suspension comprising at least one earth alkali carbonate-comprising material or the aqueous suspension S1 prepared in the side branch of the side process flow line (15b). In other words, the side branch of the side process flow line (15b) provides water for the aqueous earth alkali carbonate-comprising material suspension or the aqueous suspension S1, whereas the main branch of the side process flow line (15a) provides water directly in the container, preferably reactor tank (1).

Thus, a side branch is considered as side branch of the side process flow line (15b) if the main branch of the side process flow line (15a) and the one or more side branches are merged together before the aqueous earth alkali carbonate-comprising material suspension or the aqueous suspension S1 is directed into the container, preferably reactor tank (1). That is to say, the aqueous earth alkali carbonate-comprising material suspension or the aqueous suspension S1 is prepared in the side branch of the side process flow line (15b) and then directed into the main branch of the side process flow line (15a), e.g. for diluting the aqueous earth alkali carbonate-comprising material suspension or the aqueous suspension S1, and then the diluted aqueous earth alkali carbonate-comprising material suspension or aqueous suspension S1 is directed via the main branch of the side process flow line (15a) into the container, preferably reactor tank (1).

Thus, the main branch of the side process flow line (15a) and the side branch of the side process flow line (15b) are preferably configured such that they are merged together upstream of the container.

Alternatively, the water provided in the at least one process flow line is provided in the main process flow line (17) only. That is to say, this installation does not comprise at least one side process flow line. Thus, in one embodiment the process flow line comprises one or more main process flow line(s) (17). Preferably, the process flow line consists of one or more main process flow line(s) (17).

In one embodiment, the process flow line comprises two or more main process flow lines (17). Preferably, the main process flow line (17) can comprise a main branch of the main process flow line (17a) and one or more side branches of the main process flow line (17b).

For example, two main process flow lines (17) comprise a main branch of the main process flow line (17a) and a side branch of the main process flow line (17b).

It is appreciated that the process flow line (17) can be branched into a side branch of the main process flow line (17b) providing water for the preparation of the aqueous earth alkali carbonate-comprising material suspension or the aqueous suspension S1 and a main branch of the main process flow line (17a) providing water for diluting the aqueous earth alkali carbonate-comprising material suspension or the aqueous suspension S1 prepared in the side branch of the main process flow line (17b). In other words, the side branch of the main process flow line (17b) provides water for the aqueous earth alkali carbonate-comprising material suspension or the aqueous suspension S1, whereas the main branch of the main process flow line (17a) provides water directly in the container, preferably reactor tank (1).

It is to be noted that a side branch is considered as side branch of the main process flow line (17b) if the main branch of the main process flow line (17a) and the one or more side branches are merged together before the aqueous earth alkali carbonate-comprising material suspension or the aqueous suspension S1 is directed into the container, preferably reactor tank (1). That is to say, the aqueous earth alkali carbonate-comprising material suspension or the aqueous suspension S1 is prepared in the side branch of the main process flow line (17b) and then directed into the main branch of the main process flow line (17a), e.g. for diluting the aqueous earth alkali carbonate-comprising material suspension or the aqueous suspension S1, and then the diluted aqueous earth alkali carbonate-comprising material suspension or aqueous suspension S1 is directed via the main branch of the main process flow line (17a) into the container, preferably reactor tank (1).

Thus, the main branch of the main process flow line (17a) and the side branch of the main process flow line (17b) are preferably configured such that they are merged together upstream of the container.

b): Dosing Unit for at Least One Earth Alkali Carbonate-Comprising Material

According to b) of the inventive installation, the installation comprises at least one dosing unit (25) being suitable for dosing at least one earth alkali carbonate-comprising material into at least a part of the water provided in the process flow line for obtaining an aqueous suspension comprising at least one earth alkali carbonate-comprising material.

The term "at least one" dosing unit in the meaning of the present invention means that the installation comprises one or more dosing unit(s). For example, the installation comprises one or two, more preferably one, dosing unit(s).

The at least one dosing units may be any kind of dosing unit known to the skilled person and typically used for dosing earth alkali carbonate-comprising materials into a stream of water or directly into a tank.

The at least one dosing unit is configured for dosing at least one earth alkali carbonate-comprising material into at least a part of the water provided in the process flow line. The at least one earth alkali carbonate-comprising material preferably comprises, more preferably consists of, one or two, e.g. one, earth alkali carbonate-comprising material. For example, the at least one dosing unit is configured for dosing at least one earth alkali carbonate-comprising material comprising, more preferably consisting of, a calcium carbonate-comprising material, into at least a part of the water provided in the process flow line.

According to one embodiment, the at least one earth alkali carbonate-comprising material, preferably the calcium carbonate-comprising material, is selected from the group consisting of precipitated calcium carbonate, modified calcium carbonate, ground calcium carbonate and mixtures thereof. Preferably, the at least one dosing unit is configured for dosing ground calcium carbonate into at least a part of the water provided in the process flow line.

"Ground calcium carbonate (GCC)" in the meaning of the present invention is a calcium carbonate obtained from natural sources including marble, chalk or limestone, and processed through a treatment such as grinding, screening and/or fractionizing by wet and/or dry, for example, by a cyclone.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

"Modified calcium carbonate" in the meaning of the present invention is a surface-reacted natural calcium carbonate that is obtained by a process where natural calcium carbonate is reacted with one or more $H_3O^+$ ion donors having a $pK_a$ at 25° C. of 2.5 or less and with gaseous $CO_2$ formed in situ and/or coming from an external supply, and optionally in the presence of at least one aluminium silicate and/or at least one synthetic silica and/or at least one calcium silicate and/or at least one silicate of a monovalent salt such as sodium silicate and/or potassium silicate and/or lithium silicate, and/or at least one aluminium hydroxide and/or at least one sodium and/or potassium silicate. Further details about the preparation of the surface-reacted natural calcium carbonate are disclosed in WO 00/39222, WO 2004/083316 and US 2004/0020410 A1, the contents of these references herewith being included in the present patent application.

The earth alkali carbonate-comprising material, preferably the calcium carbonate-comprising material, is preferably a ground calcium carbonate (GCC).

For example, the at least one earth alkali carbonate-comprising material, preferably the calcium carbonate-comprising material, is selected from the group comprising marble, limestone, chalk, half burnt lime, burnt lime, dolomitic limestone, calcareous dolomite, half burnt dolomite, burnt dolomite, and precipitated earth alkali carbonates such as precipitated calcium carbonate, for example of calcitic, aragonitic and/or vateritic mineral crystal structure, for example from water de-hardening by the addition of $Ca(OH)_2$. The use of marble, limestone and/or chalk is preferred because they are naturally occurring minerals and the turbidity of the final drinking water quality is guaranteed by using a clear aqueous solution comprising at least one earth alkali hydrogen carbonate that is produced using these naturally occurring minerals. Natural marble deposits are mostly containing acid insoluble silicate impurities. However, such acid insoluble, sometimes coloured silicates do not affect the final water quality with respect of turbidity when using the product that is prepared by the inventive process.

Thus, the at least one dosing unit is configured for dosing ground calcium carbonate (GCC) being selected from the group consisting of marble, limestone, chalk and mixtures thereof into at least a part of the water provided in the process flow line.

According to one embodiment of the present invention, the at least one earth alkali carbonate-comprising material comprises, preferably consists of, particles consisting of earth alkali carbonate in an amount of ≥40.0 wt.-%, preferably of 90.0 wt.-%, more preferably of ≥95.0 wt.-% and most preferably of ≥97.0 wt.-%, based on the total dry weight of the at least one at least one earth alkali carbonate-comprising material.

For example, the at least one calcium carbonate-comprising material comprises, preferably consists of, particles consisting of calcium carbonate in an amount of ≥40.0 wt.-%, preferably of 90.0 wt.-%, more preferably of ≥95.0 wt.-% and most preferably of ≥97.0 wt.-%, based on the total dry weight of the at least one at least one calcium carbonate-comprising material.

It is further preferred that the at least one dosing unit is configured for dosing micronized earth alkali carbonate-comprising material, preferably calcium carbonate-comprising material into at least a part of the water provided in the process flow line.

For the purpose of the present invention, the term "micronized" refers to a particle size in the micrometre range, e.g., a particle size from 0.1 to 50.0 µm. The micronized particles can be obtained by techniques based on friction and/or impact, e.g., milling or grinding either under wet or dry conditions. However, it is also possible to produce the micronized particles by any other suitable method, e.g., by precipitation, rapid expansion of supercritical solutions, spray drying, classification or fractionation of natural occurring sands or muds, filtration of water, sol-gel processes, spray reaction synthesis, flame synthesis or liquid foam synthesis.

For example, the at least one earth alkali carbonate-comprising material, preferably the calcium carbonate-comprising material, has a weight median particle size $d_{50}$ from 0.1 to 50.0 µm, preferably from 0.2 to 25.0 µm, more preferably from 0.3 to 10.0 µm, and most preferably from 0.5 to 5.0 µm.

Throughout the present document, the "particle size" of an earth alkali carbonate-comprising material and other materials is described by its distribution of particle sizes. Herein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. Particle sizes were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

In one embodiment of the instant invention, the earth alkali carbonate-comprising material, preferably the calcium carbonate-comprising material, has a BET specific surface area of from 0.01 to 200.0 $m^2/g$, and preferably of from 1.0 to 100.0 $m^2/g$, measured by nitrogen gas adsorption using the BET isotherm (ISO 9277:2010).

Additionally or alternatively, the at least one earth alkali carbonate-comprising material, preferably the calcium carbonate-comprising material, can comprise an HCl insoluble content from 0.02 to 50.0 wt.-%, 0.03 to 25.0 wt.-%, or 0.05 to 10.0 wt.-%, based on the total weight of the at least one earth alkali carbonate-comprising material, preferably the calcium carbonate-comprising material. Preferably, the HCl insoluble content of the at least one earth alkali carbonate-comprising material does not exceed 1.0 wt.-%, based on the total weight of the calcium carbonate. The HCl insoluble content can be, e.g., minerals such as quartz, silicate or mica.

In one embodiment, the at least one dosing unit is configured for dosing the earth alkali carbonate-comprising material, preferably calcium carbonate-comprising material, in dry form or in aqueous form into at least a part of the water provided in the process flow line.

If the at least one dosing unit is configured for dosing the earth alkali carbonate-comprising material, preferably calcium carbonate-comprising material, in dry form into at least a part of the water provided in the process flow line, the at least one dosing unit is configured for dosing the earth alkali carbonate-comprising material, preferably calcium carbonate-comprising material, in form of a powder or in granular form into at least a part of the water provided in the process flow line.

The term "dry" with regard to the at least one earth alkali carbonate-comprising material, preferably the calcium carbonate-comprising material, is understood to be a material having less than 0.3% by weight of water relative to the weight of the at least one earth alkali carbonate-comprising material. The % water is determined according to the Coulometric Karl Fischer measurement method, wherein the at least one earth alkali carbonate-comprising material is heated to 220° C., and the water content released as vapour and isolated using a stream of nitrogen gas (at 100 ml/min) is determined in a Coulometric Karl Fischer unit.

If the at least one earth alkali carbonate-comprising material is dosed in dry form with the at least one dosing unit into at least a part of the water provided in the process flow line, the dry earth alkali carbonate-comprising material can be dosed into a slurry make-down system which is then combined with the water in the process flow line.

If the at least one dosing unit is configured for dosing the earth alkali carbonate-comprising material, preferably calcium carbonate-comprising material, in aqueous form into at least a part of the water provided in the process flow line, the at least one dosing unit is configured for dosing the earth alkali carbonate-comprising material, preferably calcium carbonate-comprising material, in form of an aqueous suspension into at least a part of the water provided in the process flow line. The aqueous suspension preferably has solids content in the range from 0.01 to 20.0 wt.-%, more preferably in the range from 1.0 to 15.0 wt.-% and most preferably in the range from 2.0 to 10.0 wt.-%, based on the total weight of the suspension. In this embodiment, the at least one dosing unit is preferably configured such that this aqueous suspension is generated on site using a high concentrated slurry without using any dispersing agent having e.g. a solid content between 30.0 and 60.0 wt.-%, such as about 40 wt.-% or using the earth alkali carbonate-comprising material, preferably the calcium carbonate-comprising material, in solid form for example, as powder or in form of granules.

For the purpose of the present invention, a "suspension" or "slurry" refers to a system comprising solvent, i.e. an aqueous solvent, and particles of earth alkali carbonate-comprising material and/or earth alkali hydrogen carbonate, wherein at least a part of the particles of the earth alkali carbonate-comprising material and/or earth alkali hydrogen carbonate are present as insoluble solids in the aqueous solvent. Said term does not exclude that a part of the earth alkali carbonate-comprising material and/or earth alkali hydrogen carbonate particles is dissolved in the aqueous solvent.

In addition to the at least one earth alkali carbonate-comprising material, preferably the calcium carbonate-comprising material, the suspension comprising the at least one earth alkali carbonate-comprising material, preferably the calcium carbonate-comprising material, can comprise further micronized minerals. According to one embodiment, the suspension comprising the at least one earth alkali carbonate-comprising material, preferably the calcium carbonate-comprising material, can comprise micronized calcium magnesium carbonate, e.g. dolomitic limestone, calcareous dolomite or half burnt dolomite, magnesium oxide such as burnt dolomite, magnesium sulphate, potassium hydrogen carbonate, sodium hydrogen carbonate and/or other minerals containing essential trace elements.

For example, the at least one earth alkali carbonate-comprising material, preferably the calcium carbonate-comprising material, dosed with the at least one dosing unit (25) into at least a part of the water provided in the process flow line is provided in a storage container (13) for solid material. Thus, the at least one dosing unit (25) is preferably connected to a storage container (13) for solid material.

The storage container (13) may be any kind of storage container known to the skilled person and typically used for storing earth alkali carbonate-comprising materials. Additionally or alternatively, the at least one dosing unit (25) is connected to a vessel (14) suitable for the preparation of a suspension comprising the at least one earth alkali carbonate-comprising material. In one embodiment, the at least one dosing unit (25) is preferably connected to a storage container (13) for solid material, which is connected to a vessel (14) suitable for the preparation of a suspension comprising the at least one earth alkali carbonate-comprising material.

The vessel (14) may be any kind of vessel known to the skilled person and typically used for preparing of a suspension comprising the at least one earth alkali carbonate-comprising material.

Preferably, the vessel (14) is connected to the process flow line by an inlet for introducing the water provided in the process flow line and an outlet for releasing the aqueous suspension comprising at least one earth alkali carbonate-comprising material.

For example, vessel (14) is connected with the side process flow line (15) or, if the side process flow line comprises a side branch, vessel (14) is preferably connected with the side branch of the side process flow line (15*b*) such that the water provided in the side process flow line (15) or the side branch of the side process flow line (15*b*) is used for the preparation of the suspension comprising the at least one earth alkali carbonate-comprising material, preferably the calcium carbonate-comprising material. The suspension comprising the at least one earth alkali carbonate-comprising material, preferably the calcium carbonate-comprising material, (16) is then preferably transferred to a container, preferably reactor tank (1). If the side process flow line (15) comprises a side branch, the side branch of the side process flow line (15*b*) is preferably connected to the main branch of the side process flow line (15*a*) upstream of the container, preferably reactor tank (1). Thus, the at least one dosing unit, e.g. connected to the storage container (13) and the vessel (14), is located in the side process flow line (15) or, if the side process flow line comprises a side branch, the at least one dosing unit, e.g. connected to the storage container (13) and the vessel (14), is located in the side branch of the side process flow line (15*b*).

Alternatively, the earth alkali carbonate-comprising material may be combined with the water of the side process flow line (15) in a container, preferably in a reactor tank (1). That is to say, the at least one earth alkali carbonate-comprising material, preferably the calcium carbonate-comprising material, may be provided in a storage container (13), which is directly connected to a container, preferably to reactor tank (1).

Thus, the at least one dosing unit can be connected to a container, preferably a reactor tank (1). In one embodiment, the at least one dosing unit (25) is connected to a storage container (13), which is directly connected to a container, preferably a reactor tank (1).

In an alternative embodiment, the at least one earth alkali carbonate-comprising material, preferably the calcium carbonate-comprising material, is directly dosed into the water provided in the process flow line.

Thus, the at least one dosing unit (25) can be configured such that the at least one earth alkali carbonate-comprising material is directly dosed into the water provided in the process flow line. In one embodiment, the at least one dosing unit (25) is connected to a storage container (13), and the at least one dosing unit is configured such that the at least one earth alkali carbonate-comprising material is directly dosed into the water provided in the process flow line.

For example, the at least one dosing unit (25) is configured such that the at least one earth alkali carbonate-comprising material is directly dosed into the water provided in the side process flow line (15) or, if the side process flow line comprises a side branch, the at least one dosing unit is configured such that the at least one earth alkali carbonate-comprising material is directly dosed into the water provided in the side branch of the side process flow line (15*b*). It is appreciated that the water provided in the side process flow line (15) or the side branch of the side process flow line (15*b*) is used for the preparation of the suspension comprising the at least one earth alkali carbonate-comprising material, preferably the calcium carbonate-comprising material.

It is thus appreciated that the at least one dosing unit (25) is located in the side process flow line. If the side process flow lines comprises a main branch of the side process flow line and a side branch of the side process flow line, the at least one dosing unit is located in the side branch of the side process flow line.

If the at least one process flow line consists of the main process flow line (17), i.e. does not comprise one or more side process flow line(s) (15), the at least one dosing unit (25) is preferably connected to a storage container (13) for solid material, which is connected to a vessel (14) suitable for the preparation of a suspension comprising the at least one earth alkali carbonate-comprising material.

Preferably, vessel (14) is connected with the main process flow line (17) or, if the main process flow line comprises a side branch, vessel (14) is preferably connected with the side branch of the main process flow line (17*b*) such that the water provided in the main process flow line (17) or the side branch of the main process flow line (17*b*) is used for the preparation of the aqueous suspension S1 comprising the at least one earth alkali carbonate-comprising material, preferably the calcium carbonate-comprising material. The suspension comprising the at least one earth alkali carbonate-comprising material, preferably the calcium carbonate-comprising material, (16) is then preferably transferred to a container, preferably reactor tank (1). If the main process flow line (17) comprises a side branch, the side branch of the main process flow line (17*b*) is preferably connected to the main branch of the main process flow line (17*a*) upstream of the container, preferably reactor tank (1). Thus, the at least one dosing unit, e.g. the storage container (13) and the vessel (14), is located in the main process flow line (17) or, if the main process flow line comprises a side branch, the at least one dosing unit, e.g. connected to the storage container (13) and the vessel (14), is located in the side branch of the main process flow line (17*b*).

Alternatively, the earth alkali carbonate-comprising material may be combined with the water of the main process flow line (17) in a container, preferably in a reactor tank (1). That is to say, the at least one earth alkali carbonate-comprising material, preferably the calcium carbonate-comprising material, may be provided in a storage container (13), which is directly connected to a container, preferably to reactor tank (1).

Thus, the at least one dosing unit can be connected to a container, preferably a reactor tank (1). In one embodiment, the at least one dosing unit (25) is connected to a storage container (13), which is directly connected to a container, preferably a reactor tank (1).

In an alternative embodiment, the at least one dosing unit (25) is configured such that the at least one earth alkali carbonate-comprising material is directly dosed into the water provided in the main process flow line (17) or, if the main process flow line comprises a side branch, the at least one dosing unit is configured such that the at least one earth alkali carbonate-comprising material is directly dosed into the water provided in the side branch of the main process flow line (17b). It is appreciated that the water provided in the main process flow line (17) or the side branch of the main process flow line (15b) is used for the preparation of the aqueous suspension S1 comprising the at least one earth alkali carbonate-comprising material, preferably the calcium carbonate-comprising material. In this embodiment, the main branch of the main process flow line (17a) and the side branch of the main process flow line (17b) are configured such that they are merged together upstream of the container.

It is thus appreciated that the at least one dosing unit (25) is located in the main process flow line if the process flow line consists of the main process flow line (17). If the main process flow lines comprises a main branch of the main process flow line (17a) and a side branch of the main process flow line (17b), the at least one dosing unit is located in the side branch of the main process flow line (17b).

Thus, the at least one dosing unit is preferably located downstream of the source of water provided in the process flow line. If the process flow line comprises a main process flow line (17) and a side process flow line (15), the at least one dosing unit is preferably located downstream of the side process flow line (15), i.e. after the process flow line is branched to form the main process flow line (17) and the side process flow line (15).

If the main process flow line (17) or the side process flow line (15) comprises branches, the at least one dosing unit (25) is preferably located downstream of the side branch of the main process flow line (17b) or the side branch of the side process flow line (15b), i.e. after the main process flow line (17) or the side process flow line (15) is branched to form the corresponding side branch. Additionally or alternatively, the at least one dosing unit (25) is preferably located upstream of the point where the side branch (17b) and the main branch (17a) of the main process flow line or the side branch (15b) and the main branch (15a) of the side process flow line are merged together.

Preferably, the at least one dosing unit (25) is located upstream of the container, more preferably the reactor tank (1).

c): Means for Dosing $CO_2$ or an Acid

According to c) of the inventive installation, the installation comprises at least one means being suitable for dosing $CO_2$ or an acid having a $pK_a$-value<5 into at least a part of the water provided in the process flow line or the aqueous suspension comprising at least one earth alkali carbonate-comprising material for obtaining an aqueous suspension S1 comprising at least one earth alkali hydrogen carbonate.

The term "at least one" means being suitable for dosing $CO_2$ or an acid having a $pK_a$-value<5 in the meaning of the present invention means that the installation comprises one or more means being suitable for dosing $CO_2$ or an acid having a $pK_a$ value<5. For example, the installation comprises one or two, more preferably one, means being suitable for dosing $CO_2$ or an acid having a $pK_a$-value<5.

The at least one means c) may be any kind of means known to the skilled person and typically used for dosing $CO_2$ or an acid having a $pK_a$-value<5 into water.

The at least one means is configured for dosing $CO_2$ or an acid having a $pK_a$-value<5 into at least a part of the water provided in the process flow line.

The at least one means is preferably suitable for dosing carbon dioxide being selected from among gaseous carbon dioxide, liquid carbon dioxide, solid carbon dioxide and a gaseous mixture of carbon dioxide and other gases such as carbon dioxide containing flue gases exhausted from industrial processes like combustion processes or calcination processes or alike. Preferably, the carbon dioxide is gaseous carbon dioxide. When a gaseous mixture of carbon dioxide and other gases is used, then the carbon dioxide is present in the range of 90.0 to about 99.0% by volume, and preferably in the range of 95.0 to 99.0% by volume, based on the total volume of the gaseous mixture. For example, the carbon dioxide is present in an amount of at least 97.0% by volume, based on the total volume of the gaseous mixture.

Alternatively, the at least one means is suitable for dosing an acid having a $pK_a$-value<5, preferably <4 at 25° C. For example, the at least one means is preferably suitable for dosing an acid being selected from the group consisting of sulphuric acid, hydrochloric acid, nitric acid or citric acid and mixtures thereof. In one embodiment, the at least one means is suitable for dosing an acid chosen among the acids with a $pK_a$-value lower than or equal to zero at 25° C. and more particularly chosen from sulphuric acid, hydrochloric acid or mixtures thereof. Alternatively, the at least one means is suitable for dosing an acid being a salt having an acidic pH, such as alkali metal hydrogen salts, e.g. $NaHSO_4$ and/or $KHSO_4$.

Preferably, the at least one means is suitable for dosing $CO_2$.

In one embodiment, $CO_2$ or an acid having a $pK_a$-value<5 is dosed into the container (1). Thus, the at least one means c) is preferably connected to the container, more preferably reactor tank (1).

In one embodiment, the container, preferably reactor tank (1), is connected to recirculating means comprising a recirculating air stream (5). For example, the recirculating means is arranged such that the air stream is recirculated from the bottom to top direction of the container, preferably reactor tank (1). In one embodiment, the at least one means c) is configured such that the $CO_2$ or acid having a $pK_a$-value<5 is injected into the recirculating air stream (5) of the recirculating means. That is to say, the at least one means c) is configured such that the $CO_2$ or acid having a $pK_a$-value<5 is injected into the air or process fluid of the recirculating air stream (5) of the recirculating means.

Thus, the container, preferably reactor tank (1), can comprise recirculating means which are configured such that air or process fluid is recirculated across at least a part of the surface of the at least one submerged membrane module from the bottom to top direction of the at least one submerged membrane module and/or the container, preferably reactor tank (1).

Alternatively, the at least one means can be configured such that the $CO_2$ or acid having a $pK_a$-value<5 is directly dosed into the water provided in the process flow line.

For example, the at least one means can be configured such that the $CO_2$ or acid having a $pK_a$-value<5 is directly dosed into the water provided in the side process flow line (15) or, if the side process flow line comprises a side branch, the at least one means can be configured such that the $CO_2$ or acid having a $pK_a$-value<5 is either directly dosed into the water provided in the main branch of the side process flow (15a), or the side branch of the side process flow line (15b).

It is thus appreciated that the at least one means can be located in the side process flow line (15). If the side process flow line (15) comprises a main branch of the side process flow line (15a) and one or more side branches of the side process flow line (15b), the at least one means is preferably located in one of the side branches of the side process flow line (15b).

In an alternative embodiment, the at least one means can be configured such that the $CO_2$ or acid having a $pK_a$-value<5 is directly dosed into the water provided in the main process flow line (17) or, if the main process flow line comprises a side branch, the at least one means can be configured such that the $CO_2$ or acid having a $pK_a$-value<5 is directly dosed into either the water provided in the main branch of the main process flow line (17a) or water provided in the side branch of the main process flow line (17b).

It is thus appreciated that the at least one means can be located in the main process flow line if the process flow line consists of the main process flow line (17). If the main process flow lines comprises a main branch of the main process flow line (17a) and one or more side branches of the main process flow line (17b), the at least one means is preferably located in one of the side branches of the main process flow line (17b).

In an alternative embodiment, the at least one means is connected to a vessel (14) suitable for the preparation of an aqueous suspension S1 comprising the at least one earth alkali hydrogen carbonate. Preferably, the vessel (14) is connected to the process flow line by an inlet for introducing the water provided in the process flow line and an outlet for releasing the aqueous suspension S1 comprising the at least one earth alkali hydrogen carbonate.

In one embodiment, vessel (14) is thus preferably connected to the at least one dosing unit, e.g. connected to the storage container (13), and the at least one means c). Alternatively, the at least one dosing unit, e.g. connected to the storage container (13), is connected to one vessel (14a) and the at least one means c) is connected to another vessel (14b). In this case, the at least one means c) is preferably located downstream of the at least one dosing unit.

Thus, the at least one means c) and the vessel (14), are preferably located in the side process flow line (15) or, if the side process flow line comprises a side branch, the at least one means c) and the vessel (14), are located in the side branch of the side process flow line (15b).

If the at least one process flow line consists of the main process flow line (17), i.e. does not comprise one or more side process flow line(s) (15), the at least one means c) and vessel (14) are connected with the main process flow line (17) or, if the main process flow line comprises a side branch, at least one means c) and vessel (14) are preferably connected with the side branch of the main process flow line (17b).

Thus, the at least one means c) is preferably located downstream of the source of water provided in the process flow line. If the process flow line comprises a main process flow line (17) and a side process flow line (15), the at least one means c) is preferably located downstream of the side process flow line (15), i.e. after the process flow line is branched to form the main process flow line (17) and the side process flow line (15).

If the main process flow line (17) or the side process flow line (15) comprises branches, the at least one means c) is preferably located downstream of the side branch of the main process flow line (17) or the side branch of the side process flow line (15), i.e. after the main process flow line (17) or the side process flow line (15) is branched to form the corresponding side branch.

Preferably, the at least one means c) is preferably located upstream of the container, more preferably reactor tank (1).

Alternatively, the at least one means c) is connected to the container, more preferably to the recirculating means suitable for recirculating air or process fluid across at least a part of the surface of the at least one submerged membrane module from the bottom to top direction of the at least one submerged membrane module and/or the container.

d): Container being Connected to the Process Flow Line

According to d) of the inventive installation, the installation comprises a container being connected to the at least one process flow line by an inlet.

The container may be any kind of container known to the skilled person and typically used for combining and/or mixing water with at least one earth alkali carbonate-comprising material and $CO_2$ or an acid having a $pK_a$-value<5. Preferably, the container is configured such that the combining and/or mixing can be carried out under mixing and/or homogenizing conditions.

For example, the container is a reactor tank (1). Such tanks are well known to the skilled person and are available from a wide range of suppliers.

In particular, the container, preferably reactor tank (1), can be configured such that the water provided in the process flow line is combined with the at least one earth alkali carbonate-comprising material and the $CO_2$ or acid having a $pK_a$-value<5 in any order such as to obtain an aqueous suspension S1 comprising at least one earth alkali hydrogen carbonate.

In one embodiment, the container, preferably reactor tank (1), can be configured such that the filling level (11) in the container, preferably reactor tank (1), and/or the pressure (8) in the container, preferably reactor tank (1), is measured.

It is appreciated that the dissolution rate of earth alkali carbonate in the liquid phase, i.e. water, of the aqueous suspension comprising the at least one earth alkali carbonate-comprising material to obtain the solution S1 comprising at least one earth alkali hydrogen carbonate depends on the quantity of carbon dioxide or acid having a $pK_a$-value<5 dosed but also on the temperature, pH, pressure, initial earth alkali carbonate concentration in the suspension as well as the dosing rate at which the carbon dioxide or acid having a $pK_a$-value<5 (at 25° C.) is introduced into the aqueous suspension comprising the at least one earth alkali carbonate-comprising material.

It is preferred that the container, preferably reactor tank (1), is configured such that the carbon dioxide concentration in the aqueous suspension S1 comprising at least one earth alkali hydrogen carbonate obtained in the container is in the range from 10 to 1 500 mg/l, more preferably from 20 to 1 000 mg/l and most preferably from 50 to 400 mg/l.

Additionally or alternatively, the container, preferably reactor tank (1), can be configured such that the amount of $CO_2$ used, in mol, to produce 1 mol of the at least one earth alkali hydrogen carbonate in the aqueous suspension S1 obtained in the container is in the range of 1.0 to 6.0 mol, preferably in the range of 1.0 to 3.0 mol, and most preferably in the range of 1.0 to 2.0 mol.

It is appreciated that the aqueous suspension S1 comprising at least one earth alkali hydrogen carbonate obtained in the container preferably has an earth alkali metal concentration as earth alkali hydrogen carbonate in the range from 20 to 1 000 mg/l, preferably in the range from 50 to 600 mg/l and most preferably from 80 to 400 mg/l. In one embodiment, the aqueous suspension S1 comprising at least one earth alkali hydrogen carbonate obtained in the container being calcium hydrogen carbonate has a calcium metal concentration as calcium hydrogen carbonate in the range from 20 to 1 000 mg/l, preferably in the range from 50 to 600 mg/l and most preferably from 80 to 400 mg/l.

As mentioned above, an aqueous suspension S1 comprising at least one earth alkali hydrogen carbonate is obtained in the container, preferably reactor tank (1).

The aqueous suspension S1 comprising at least one earth alkali hydrogen carbonate obtained in the container, preferably reactor tank (1), further comprises undissolved solid particles of the at least one earth alkali carbonate-comprising material, and thus the aqueous suspension S1 comprising at least one earth alkali hydrogen carbonate is subjected to a filtering step.

In view of this, the aqueous suspension S1 comprising at least one earth alkali hydrogen carbonate obtained in the container, preferably reactor tank (1), preferably has a turbidity value of more than 10 NTU, more preferably the aqueous suspension S1 comprises visible solids, i.e. is opaque.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

In one embodiment of the present invention, the aqueous suspension S1 comprising at least one earth alkali hydrogen carbonate obtained in the container, preferably reactor tank (1), preferably has solids content in the range from 0.01 to 10.0 wt.-%, more preferably in the range from 0.5 to 10.0 wt.-% and most preferably in the range from 1.2 to 8.0 wt.-%, based on the total weight of the aqueous suspension S1.

It is thus one specific requirement of the present installation that the container, preferably reactor tank (1), is configured such that at least one submerged membrane module is located in the container for filtering at least a part of the aqueous suspension S1 by passing the aqueous suspension S1 through the least one submerged membrane module in order to obtain an aqueous solution S2 comprising at least one earth alkali hydrogen carbonate.

In one embodiment, the combining and/or mixing of the water with at least one earth alkali carbonate-comprising material and $CO_2$ or an acid having a $pK_a$-value<5 and the filtering of at least a part of the aqueous suspension S1 can be carried out in the same container, preferably reactor tank (1). Alternatively, the combining and/or mixing of the water with at least one earth alkali carbonate-comprising material and $CO_2$ or an acid having a $pK_a$-value<5 can be carried out in one container, preferably reactor tank (1) and the filtering of at least a part of the aqueous suspension S1 can be carried out in another container, preferably reactor tank (1a). In this embodiment, the container, preferably reactor tank (1a), in which the filtering of at least a part of the aqueous suspension S1 is carried out is located downstream of the container, preferably reactor tank (1), in which the combining and/or mixing of the water with at least one earth alkali carbonate-comprising material and $CO_2$ or an acid having a $pK_a$-value<5 is carried out.

In view of the decreased overall consumption of energy and higher cost efficiency, it is preferred that the combining and/or mixing of the water with at least one earth alkali carbonate-comprising material and $CO_2$ or an acid having a $pK_a$-value<5 and the filtering of at least a part of the aqueous suspension S1 can be carried out in the same container, preferably reactor tank (1). Thus, the installation preferably comprises one container, preferably reactor tank (1).

It is one specific requirement of the inventive process that at least a part of the aqueous suspension S1 is filtered through at least one submerged membrane module (2). Preferably, the total quantity of the aqueous suspension S1 is filtered through at least one submerged membrane module (2).

The container is thus configured such that at least one submerged membrane module (2) is located in the container, preferably in a reactor tank (1).

The at least one submerged membrane module may be any kind of submerged membrane module known to the skilled person and typically used for filtering sludges and aqueous suspensions comprising minerals, pigments and/or fillers. For example, a submerged membrane module of Toray Industries, Inc. may be used.

The at least one submerged membrane module (2), i.e. the membrane, preferably has a pore size of <1 µm, and more preferably <0.1 µm, e.g. from 0.04 to 0.9 µm such as about 0.04 µm or 0.08 µm. The at least one submerged membrane module (2) is preferably of a ceramic, polymer, or other synthetic material. For example, the at least one submerged membrane module (2) comprises a membrane which is made of a material selected from the group comprising a sintered material, porous porcelain, synthetic polymers, like polyethylene, polypropylene, polysulfones, polyethylene sulfone, polyvinylidene fluoride (PVDF) or Teflon®, and mixtures thereof. In one embodiment, the at least one submerged membrane module (2) further comprises fibres or a non-woven fabric, such as fibres or a non-woven fabric made of a material selected from the group comprising synthetic polymers, like polyethylene, polypropylene, polyester or, and mixtures thereof.

It is appreciated that the number of the at least one submerged membrane module (2) depends on the size of the installation. The person skilled in the art will adapt this number of submerged membrane modules on the specific installation size used.

The at least one submerged membrane module (2) preferably has a high flux, i.e. a high flow rate per unit membrane area and time (flux=$l/(m^2h)$). For example, the at least one submerged membrane module (2) has a flux of ≥10 $l/(m^2h)$, preferably in the range from 50 to 150 $l/(m^2h)$, and most preferably in the range from 80 to 150 $l/(m^2h)$.

It is preferred that the at least one submerged membrane module (2) is arranged such that air or process fluid is recirculated (5) across at least a part of the surface of the at least one submerged membrane module. This has the advantage that $CO_2$ can be efficiently introduced into the container, preferably the reactor tank (1), for improving the efficiency of formation of the aqueous suspension S1 comprising at least one earth alkali hydrogen carbonate. Furthermore, this arrangement may result in a cleaning of the at least one submerged membrane module (2) by cross flow aeration which may reduce the fouling of the at least one submerged membrane module (2). Furthermore, this arrangement has the benefit of maintaining a homogenous suspension and preventing the settling of undissolved particles.

In one embodiment, air or process fluid is recirculated (5) across at least a part of the surface of the at least one submerged membrane module (2) from the bottom to top direction of the at least one submerged membrane module (2) and/or the container, preferably the reactor tank (1), preferably the at least one submerged membrane module (2) and the container, preferably the reactor tank (1).

Thus, the container preferably comprises recirculating means which are configured such that air or process fluid is recirculated (5) across at least a part of the surface of the at least one submerged membrane module (2) from the bottom to top direction of the at least one submerged membrane module (2) and/or the container, preferably the reactor tank (1)

It is appreciated that the $CO_2$ or acid (4) is preferably added to the air or process fluid which is recirculated (5) across at least a part of the surface of the at least one submerged membrane module (2).

If air or process fluid is recirculated across at least a part of the surface of the at least one submerged membrane module, it is preferred that the container, preferably the reactor tank (1), is sealed and the air at the top of the container, preferably the reactor tank (1), is used as the feed and reintroduced (5) at the bottom of the container, preferably the reactor tank (1). Thus, the container is preferably a sealed reactor tank (1).

It is appreciated that the recirculating means is preferably independent from the side process flow line (15) or the main process flow line (17), i.e. the inlet and outlet of the recirculating means are connected to the container, preferably the reactor tank (1), in positions differing from the inlet and outlet of the side process flow line (15) or the main branch of the side process flow line (15a) or the side branch of the side process flow line (15b) or the main process flow line (17) or the main branch of the main process flow line (17a) or the side branch of the main process flow line (17b).

It is a further requirement that the container, preferably reactor tank (1), is connected to the at least one process flow line by an inlet. Additionally, the container, preferably reactor tank (1), comprises at least one outlet for releasing the aqueous solution S2 comprising at least one earth alkali hydrogen carbonate from the container, preferably reactor tank (1). Thus, the inlet connected to the at least one process flow line and the outlet for releasing the aqueous solution S2 or the container, preferably reactor tank (1), are preferably independent from the inlet and outlet of the recirculating means, i.e. they are connected in positions differing from each other. It is thus preferred that the container, preferably reactor tank (1), is configured such that the outlet for releasing the aqueous solution S2 is connected to the permeate side of the at least one submerged membrane module (2).

In one embodiment, the container, preferably reactor tank (1), is configured such that the at least one submerged membrane module (2) can be subjected to a cleaning.

For example, the container, preferably reactor tank (1), is configured such that a backwashing of the at least one submerged membrane module can be carried out.

The term "backwashing" in the meaning of the present invention refers to the addition of water and/or chemicals from the other side of the at least one submerged membrane module (2), i.e. from the permeate side to the feed side of the at least one submerged membrane module and/or container, for cleaning the at least one submerged membrane module (2).

For example, the backwashing of the at least one submerged membrane module (2) may be carried out with water. If the inventive process comprises a backwashing of the at least one submerged membrane (2) with water, the backwashing may be done every 5 to 60 min, e.g. every 10 to 15 min. Additionally, $CO_2$ or an acid having a $pK_a$-value<5 (at 25° C.) can be added to the water. In this embodiment, the backwashing may be done once or twice a week.

It is appreciated that the present installation can be carried out in a batch mode, a semi-continuous or a continuous mode.

The wording "semi-continuous process" in the meaning of the present application refers to a process which is operated in continuous mode but with intermittent breaks, e.g. for carrying out a backwashing of the at least one submerged membrane module (2).

The aqueous solution S2 comprising at least one earth alkali hydrogen carbonate obtained by the inventive installation preferably has a carbon dioxide concentration in the range from 0.001 to 300 mg/l, more preferably in the range from 0.1 to 150 mg/l, most preferably in the range of 0.5 to 50.

It is appreciated that the aqueous solution S2 comprising at least one earth alkali hydrogen carbonate obtained by the inventive installation preferably has an earth alkali metal concentration as earth alkali hydrogen carbonate in the range from 20 to 1 000 mg/l. Preferably, the aqueous solution S2 comprising at least one earth alkali hydrogen carbonate obtained by the inventive installation has an earth alkali metal concentration as earth alkali hydrogen carbonate in the range from 50 to 500 mg/l and more preferably from 80 to 300 mg/l.

In one embodiment, the aqueous solution S2 comprising at least one earth alkali hydrogen carbonate obtained by the inventive installation comprises calcium hydrogen carbonate, the solution having a calcium metal concentration as calcium hydrogen carbonate in the range from 20 to 1 000 mg/l, preferably in the range from 50 to 500 mg/l and more preferably from 80 to 300 mg/l.

In an alternative embodiment, the aqueous solution S2 comprising at least one earth alkali hydrogen carbonate obtained by the inventive installation comprises magnesium hydrogen carbonate, the solution having a magnesium metal concentration as magnesium hydrogen carbonate in the range from 20 to 1 000 mg/l, preferably in the range from 50 to 400 mg/l and more preferably from 80 to 300 mg/l.

Alternatively, the aqueous solution S2 comprising at least one earth alkali hydrogen carbonate obtained by the inventive installation comprises calcium hydrogen carbonate and magnesium hydrogen carbonate, the solution having a total calcium and magnesium metal concentration as calcium and magnesium hydrogen carbonate in the range from 20 to 1 000 mg/l, preferably in the range from 50 to 500 mg/l and more preferably from 80 to 300 mg/l.

In one embodiment of the present invention, the aqueous solution S2 comprising at least one earth alkali hydrogen carbonate obtained by the inventive installation has a dissolved content of the at least one earth alkali hydrogen carbonate in the range from 0.001 to 2.0 wt.-%, more preferably in the range from 0.001 to 0.05 wt.-% and most preferably in the range from 0.001 to 0.03 wt.-%, based on the total weight of the aqueous solution.

Additionally or alternatively, the aqueous solution S2 comprising at least one earth alkali hydrogen carbonate obtained by the inventive installation has preferably a turbidity value of lower than 0.5 NTU, and more preferably of lower than 0.3 NTU. For example, the aqueous solution S2 comprising at least one earth alkali hydrogen carbonate obtained by the inventive installation has a turbidity value of lower than 0.2 NTU or of lower than 0.1 NTU.

It is appreciated that the aqueous solution S2 comprising at least one earth alkali hydrogen carbonate obtained by the inventive installation preferably has a pH-value in the range from 6.1 to 8.9 and preferably in the range from 6.5 to 8.5.

According to one embodiment, the aqueous solution S2 comprising at least one earth alkali hydrogen carbonate obtained by the inventive installation has a German hardness from 1 to 55° dH, preferably from 3 to 30° dH, and most preferably from 4.5 to 17° dH.

For the purpose of the present invention, the German hardness is expressed in "degree German hardness, ° dH". In this regard, the German hardness refers to the total amount of earth alkali ions in the aqueous solution comprising the earth alkali hydrogen carbonate.

It is preferred that the aqueous solution comprising at least one earth alkali hydrogen carbonate obtained by the inventive installation has a German hardness that is at least 3° dH, more preferably at least 5° dH, higher than the German hardness of the water provided in the process flow line.

In one embodiment, the aqueous solution S2 comprising at least one earth alkali hydrogen carbonate obtained by the inventive installation is suitable as mineralized water. This is preferably the case if the installation does not comprise one or more side process flow line(s) (15). That is to say, the aqueous solution S2 comprising at least one earth alkali hydrogen carbonate obtained by the inventive installation is mineralized water if the installation comprises the main process flow (17) only.

Alternatively, the aqueous solution S2 comprising at least one earth alkali hydrogen carbonate obtained by the inventive installation is suitable for the mineralization of water. For example, the aqueous solution S2 comprising at least one earth alkali hydrogen carbonate obtained by the inventive installation is suitable for the mineralization and/or stabilization of desalinated or naturally soft water. This is preferably the case, if the installation comprises one or more side process flow line(s) (15).

For example, the aqueous solution S2 comprising at least one earth alkali hydrogen carbonate by the inventive installation is transferred (9) from the process flow line (15) into the main process flow line (17) for the mineralization of the water.

The water that can be mineralised and/or stabilized by using the aqueous solution S2 comprising at least one earth alkali hydrogen carbonate obtained by the inventive installation can be derived from various sources and can be selected from amongst distilled water, industrial water, tap water, desalinated water such as desalinated sea water, brackish water or brine, treated wastewater or naturally soft water such as ground water, surface water or rainfall. Preferably, the water to be mineralised and/or stabilized by using the aqueous solution S2 comprising at least one earth alkali hydrogen carbonate obtained by the inventive installation is desalinated water, e.g. permeate or distillate obtained from a desalination process.

In order to neutralize any remaining "aggressive" carbon dioxide and/or to increase the pH to achieve a stable and balanced final water quality, it is preferred to strip the aggressive carbon dioxide, add a base to the mineralised water obtained by the inventive installation, or a combination of both.

Thus, the installation preferably comprises base dosing means downstream of the container, preferably reactor tank (1), for introducing a base to the aqueous solution S2 comprising at least one earth alkali hydrogen carbonate.

In one embodiment, the base dosing means is configured for dosing the base, preferably provided in water, into the main process flow (17) downstream of the container, preferably reactor tank (1), to adjust the pH-value of the mineralised water to a range from 7.0 to 9.0 and to form mineralised water having an earth alkali concentration as earth alkali hydrogen carbonate in the range from 10 to 300 mg/l.

For example, the installation comprises base dosing means for introducing a base to the main process flow line (17) downstream of where the side process flow line (15) and main process flow line (17) are merged together, preferably downstream of the container, preferably for introducing a base to the mixture of the aqueous solution S2 comprising at least one earth alkali hydrogen carbonate together with the water in the main process flow line (17).

The base dosing means for introducing a base is preferably configured for introducing an alkali hydroxide and/or earth alkali hydroxide. More preferably, the base dosing means for introducing a base is configured for introducing a base which is an alkali hydroxide and/or earth alkali hydroxide selected from calcium hydroxide and/or magnesium hydroxide and/or sodium hydroxide, e.g. calcium hydroxide or magnesium hydroxide or sodium hydroxide, e.g. calcium hydroxide.

For example, the base dosing means for introducing a base is preferably configured for introducing an earth alkali hydroxide having a weight median particle size $d_{50}$ from 0.1 to 100.0 μm, preferably from 0.2 to 50.0 μm, more preferably from 0.3 to 25.0 μm, and most preferably from 0.5 to 10.0 μm.

In one embodiment of the present invention, the base being an earth alkali hydroxide has a BET specific surface area of from 0.01 to 200.0 $m^2/g$, and preferably of from 1.0 to 100.0 $m^2/g$, measured by nitrogen gas adsorption using the BET isotherm (ISO 9277:2010).

The base dosing means for introducing a base is preferably configured for introducing an alkali hydroxide and/or earth alkali hydroxide such that the concentration of the alkali hydroxide and/or earth alkali hydroxide added to the mineralised water is in the range from 0.1 to 100 mg/l and preferably in the range from 0.5 to 10 mg/l.

The base is preferably provided in water. Thus, the base dosing means for introducing a base is preferably configured for introducing the base in form of a solution or suspension. If the base being an alkali hydroxide and/or earth alkali hydroxide is in form of a solution or suspension, the alkali hydroxide and/or earth alkali hydroxide content is preferably from 0.5 wt.-% to 50 wt.-%, preferably about 20 wt.-%, based on the total weight of the solution or suspension.

The alkali hydroxide and/or earth alkali hydroxide solution or suspension may be generated on site or independently from the inventive process. If the alkali hydroxide and/or earth alkali hydroxide solution or suspension is prepared independently from the inventive installation, the alkali hydroxide and/or earth alkali hydroxide solution or suspension is preferably not prepared from the water provided in the process flow line. Alternatively, the alkali hydroxide and/or earth alkali hydroxide solution or suspension is prepared with the water provided in the process flow line.

By adding the base, preferably an alkali hydroxide and/or earth alkali hydroxide, to the mineralised water in the main process flow (17), the pH-value of the mineralised water is adjusted to a range from 7.0 to 9.0. Preferably, the pH-value of the mineralised water is adjusted to a pH-value in the range from 7.2 to 8.9 and preferably in the range from 7.8 to 8.4. It is appreciated that the pH adjustment depends on the level of mineralization and the targeted final water quality.

In one embodiment, a part of the water provided in the process flow line forms the main process flow (17) and the remaining part of the water forms the one or more side process flow line(s) (15). Thus, the one or more side process flow line(s) (15) is/are connected to the main process flow line (17), preferably in that the one or more side process flow line(s) (15) is/are connected to the main process flow line (17) by an inlet and outlet.

In one embodiment, the outlet of the one or more side process flow line(s) (15) is preferably located downstream of the inlet of the one or more side process flow line(s) (15) at the main process flow (17).

A further aspect of the present invention refers to the use of the installation as defined herein for the preparation of an aqueous solution comprising at least one earth alkali hydrogen carbonate.

Another aspect of the present invention refers to the use of the installation as defined herein for the mineralization and/or stabilization of water. The water is preferably desalinated or naturally soft water.

With regard to the definition of the installation and preferred embodiments thereof, reference is made to the statements provided above when discussing the technical details of the installation for the preparation of an aqueous solution comprising at least one earth alkali hydrogen carbonate of the present invention.

BRIEF DESCRIPTION OF THE FIGURES

List of Reference Signs (1): reactor tank
(2): submerged membranes (module)
(3): product storage tank
(4): carbon dioxide injection
(5): recirculation air
(6): pressure measurement of recirculation air
(7): pressure measurement in reactor tank
(8): pressure measurement in aqueous solution
(9): aqueous solution S2
(10): flow measurement of aqueous solution
(11): level measurement in reactor tank
(12): turbidity measurement in aqueous solution
(13): storage container for calcium carbonate
(14): vessel for preparing a suspension of calcium carbonate
(15): side process flow line water supply to process
(16): suspension of micronized calcium carbonate
(17): main process flow line
(17a): main branch of the main process flow line
(17b): side branch of the main process flow line
(18): measurement of pH of blended water stream
(19): measurement of electrical conductivity of blended water stream
(20): storage tank for $Ca(OH)_2$
(21): $Ca(OH)_2$ dosing process stream
(22): pH measurement of final water stream
(23): conductivity measurement of final water stream
(24): final treated water stream
(25): calcium carbonate dosing screw feeder FIG. 1 refers to an installation being suitable for carrying out the general process according to the present invention.

which is located in the main branch of the side process flow line (15a) and the base dosing means for the Ca(OH)$_2$ dosing (21).

Figure 13:
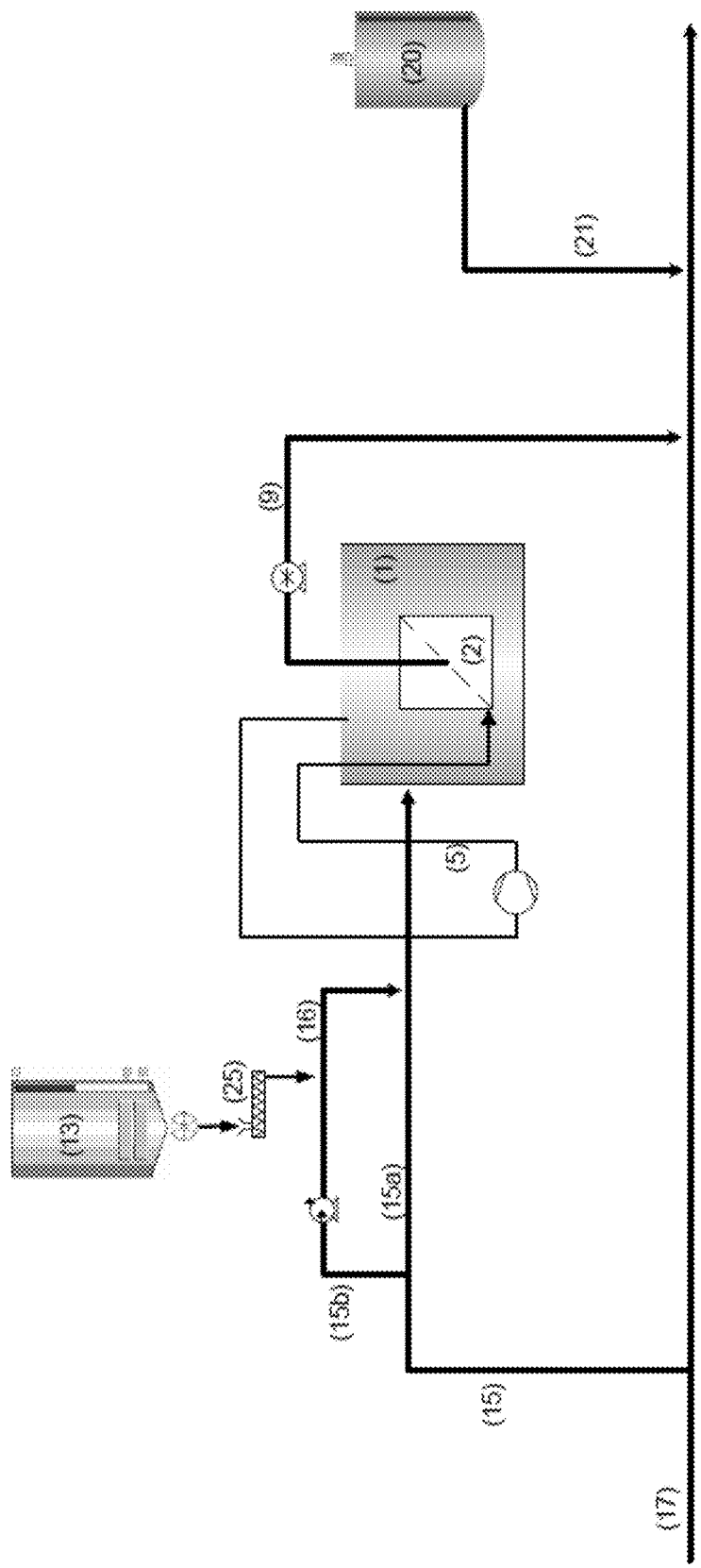

FIG. 13 refers to a schematic illustration of an installation comprising a main process flow line (17) a main branch of the side process flow line (15a) and a side branch of the side process flow line (15b), wherein the dosing unit is configured such that the calcium carbonate is directly dosed into the side branch of the side process flow line (15b). The illustration further shows the container (1) comprising the submerged membrane module (2) and recirculation air (5) which is located in the main branch of the side process flow line (15a) and the base dosing means for the Ca(OH)$_2$ dosing (21).

The scope and interest of the invention will be better understood based on the following examples which are intended to illustrate certain embodiments of the invention and are non-limitative.

EXAMPLES

1 Measurement Methods

In the following the measurement methods implemented in the examples are described.

pH of an Aqueous Suspension or Solution

The pH of a suspension or solution was measured using a WTW Multi 3420 pH meter with integrated temperature compensation and a WTWWTW SenTix 940 pH probe. The calibration of the pH electrode was performed using standards of pH values 4.01, 7.00 and 9.21. The reported pH values are the endpoint values detected by the instrument (the endpoint is when the measured signal differs by less than 0.1 mV from the average over the previous 6 seconds).

Solids Content of an Aqueous Suspension

Moisture Analyser

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Particle Size Distribution (Mass % Particles with a Diameter<X) and Weight Median Diameter ($d_{50}$) of a Particulate Material Weight grain diameter and grain diameter mass distribution of a particulate material were determined via the sedimentation method, i.e. an analysis of sedimentation behaviour in a gravitational field. The measurement was made with a Sedigraph™ 5120 or a Sedigraph™ 5100 of Micromeritics Instrument Corporation.

The method and the instrument are known to the skilled person and are commonly used to determine grain size of fillers and pigments. The measurement is carried out in an aqueous solution of 0.1 wt.-% Na$_4$P$_2$O$_7$. The samples are dispersed using a high speed stirrer and supersonics.

Turbidity of an Aqueous Suspension of Solution

The turbidity was measured with a Hach Lange 2100AN IS Laboratory Turbidimeter and the calibration was performed using StabCal turbidity standards (formazine standards) of <0.1, 20, 200, 1 000, 4 000 and 7 500 NTU.

Conductivity

The conductivity was measured at 25° C. using Mettler Toledo Seven Multi instrumentation equipped with the corresponding Mettler Toledo conductivity expansion unit and a Mettler Toledo InLab® 741 conductivity probe.

The instrument was first calibrated in the relevant conductivity range using commercially available conductivity calibration solutions from Mettler Toledo. The influence of temperature on conductivity is automatically corrected by the linear correction mode. Measured conductivities were reported for the reference temperature of 20° C. The reported conductivity values were the endpoint values detected by the instrument (the endpoint is when the measured conductivity differs by less than 0.4% from the average over the last 6 seconds).

Temperature

The temperature was measured with a handheld WTW probe of Xylem Analytics.

Hardness of the Aqueous Solution

The ions involved in water hardness, i.e. Ca$^{2+}$(aq) and Mg$^{2+}$(aq), have been determined by titration with a chelating agent, ethylenediaminetetraacetic acid (EDTA—disodium salt 0.01 M). For buffering pH constant at 10, NH$_3$—NH$_4$Cl buffer was used. Titration using Eriochrome Black T as indicator determines total hardness due to Ca$^{2+}$(aq) and Mg$^{2+}$(aq) ions until the solution turns from wine red to sky blue. The amount of total hardness has been calculated by the following equation:

$$\text{Hardness} = \text{Volume of EDTA (ml)} \times 0.01 \times 100.08 \times 1\,000/(\text{Volume of sample (ml)})$$

Alkalinity of the Aqueous Solution

The alkalinity of the aqueous solution has been determined by titration of a sample with a 0.1 M solution of hydrochloric acid. The end point of the titration is reached at a constant pH of 4.3. The amount of the alkalinity has been calculated by the following equation:

$$\text{Alkalinity} = \text{Volume of acid (ml)} \times 0.1 \times 100.08 \times 1\,000/(2 \times \text{Volume of sample (ml)})$$

Acidity of Aqueous Solution

The acidity of the aqueous solution has been determined by titration of the free CO$_2$ with a 0.01 M solution of sodium hydroxide. The end point of the titration is reached at a constant pH of 8.3. The amount of free CO$_2$ has been calculated by the following equation:

$$\text{Free CO}_2 = \text{Volume of NaOH (ml)} \times 0.01 \times 44.01 \times 1\,000/\text{Volume of sample (ml)}$$

Langelier Saturation Index (LSI)

The Langelier Saturation Index (LSI) describes the tendency of an aqueous liquid to be scale-forming or corrosive, with a positive LSI indicating scale-forming tendencies and a negative LSI indicating a corrosive character. A balanced Langelier Saturation Index, i.e. LSI=0, therefore means that the aqueous liquid is in chemical balance. The LSI is calculated as follows:

$$\text{LSI} = \text{pH} - \text{pH}_s,$$

wherein pH is the actual pH value of the aqueous liquid and pH$_s$ is the pH value of the aqueous liquid at CaCO$_3$ saturation. The pH$_s$ can be estimated as follows:

$$\text{pH}_s = (9.3 + A + B) - (C + D),$$

wherein A is the numerical value indicator of total dissolved solids (TDS) present in the aqueous liquid, B is the numerical value indicator of temperature of the aqueous liquid in K, C is the numerical value indicator of the calcium concentration of the aqueous liquid in mg/l of CaCO$_3$, and D is the numerical value indicator of alkalinity of the aqueous liquid in mg/l of CaCO$_3$. The parameters A to D are determined using the following equations:

$A = (\log_{10}(TDS) - 1)/10$, $B = -13.12 \times \log_{10}(T+273) + 34.55$, $C = \log_{10}[Ca^{2+}] - 0.4$, $D = \log_{10}(TAC)$, wherein TDS are the total dissolved solids in mg/l, T is the temperature in ° C., $[Ca^{2+}]$ is the calcium concentration of the aqueous liquid in mg/l of $CaCO_3$, and TAC is the alkalinity of the aqueous liquid in mg/l of $CaCO_3$.

2 Examples

Figure 1:
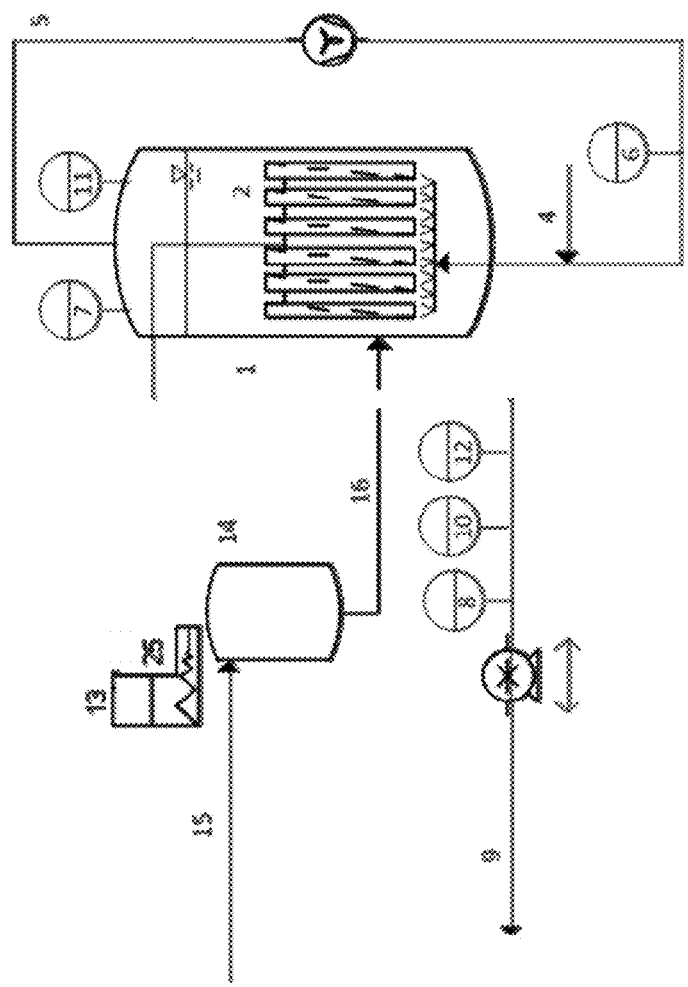

Inventive Installation—Preparation of an Aqueous Solution of Calcium Bi-Carbonate A general process flow sheet of one installation according to the present invention is shown in FIG. 1. The installation comprises a reactor tank (1) with a submerged membrane (2) of 50 m² inside, a calcium carbonate storage silo (13) with dosing screw feeder and a vessel for preparing a suspension of the calcium carbonate (14).

A calcium hydrogen carbonate solution (9) is produced in permeate stream and this could be used to increase the mineral content and alkalinity of another flow.

The feed water was obtained from reverse osmosis system, producing water of the following water specification:
Sodium: <1 mg/l
Chloride: <2 mg/l
Calcium: 8 mg/l
Magnesium: <1 mg/l
Alkalinity: 12 mg/l (as $CaCO_3$)
° dH: 1.12
pH: 6.9
Conductivity: 24 µS/cm A calcium hydrogen carbonate solution can be produced using the above mentioned installation in the following manner: Reactor tank (1) is originally filled with a calcium carbonate suspension of 5.0 wt.-% to a defined volume that covers the submerged membrane's surface determined by level measurement in the reactor tank (11). A blower starts recirculating air volume (5) from the top of the reactor tank (1) to diffusers located at the bottom of the submerged membranes (2) to ensure a homogenous suspension is maintained within the reactor tank (1) and to provide some cleaning effect for the submerged membranes (2). The air volume (5) is recirculated at a rate of around 200 times per h. A controlled quantity of carbon dioxide is added at (4) in the air stream. Carbon dioxide loaded recirculation air passes over the submerged membranes (2) from the bottom to the top of the reactor tank (1) creating turbulence, and carbon dioxide passes from the air stream to the calcium carbonate suspension increasing the amount of dissolved carbon dioxide within the suspension. The reaction between the calcium carbonate and the dissolved carbon dioxide allows the formation of an alkaline calcium hydrogen carbonate solution within the reactor tank (1). At the same time, calcium carbonate is added to the vessel (14) from the storage silo (13) for the preparation of a calcium carbonate suspension within the vessel (14). A loss-in-weight screw feeder is used to accurately measure the quantity of calcium carbonate added. Water is also added to the tank and a mixer used to create a homogenous suspension of a known solids content. The suspension (16) of micronized calcium carbonate is then transferred to the reactor tank (1) at a rate equal to the amount of calcium carbonate that is dissolved through reaction with the carbon dioxide, so that the total amount of undissolved calcium carbonate within the reactor tank (1) remains constant. An aqueous solution S2 (9) of filtrated permeate is extracted from the reactor tank (1) through the submerged membranes (2).

Start-Up Pilot Unit

Natural calcium carbonate powder (Millicarb® from Omya International AG, Orgon France, $d_{50}=3$ µm) was used as starting material in a pilot plant according to the inventive installation. Reactor (1) was filled with 900 l of prepared 5 wt.-% calcium carbonate powder suspension, executed by level control (11). Recirculation air stream (5) fan started with 10 m³/h for regeneration of membranes via turbulence. Overpressure of airflow was measured by (6).

Example 1

To produce high loaded concentrate (~250 mg/l alkalinity) 99 g of carbon dioxide (4) was dosed to recirculating air stream within 1 h. Continuous production was started at the end of the first hour recirculation time. During continuous production a suspension of 250 mg/l calcium carbonate (16) was added to the reactor (1) to account for the continuous dissolution of calcium carbonate within the reactor tank (1). At the same time a clear aqueous solution S2 (9) was extracted through the submerged membranes (2) with a concentration of 250 mg/l calcium bi-carbonate (measured as calcium carbonate) using a bi-directional dosing pump. Both ratios—suspension of micronized calcium carbonate (16) and aqueous solution (9)—were controlled by level measurement (11) in reactor tank (1) and flowmeter measurement (10) of the aqueous solution S2 (9). Primary settings of ratios depend from achievable membrane flux rates and were measured as trans-membrane-pressure (8). Quality of aqueous solution S2 (9) was controlled by turbidity measurement (12) and titrations.

The operating conditions and water quality results are given in Table 1 and Table 2 below.

TABLE 1

Process streams of Example 1.

| Process stream | (16) | (9) | (5) |
|---|---|---|---|
| Description | Calcium carbonate suspension | Calcium bi-carbonate solution S2 | Recirculation air |
| Flow rate (l/h) | 1 250 | 1 250 | 20 000 |
| Solids content (wt.-%) | 0.025 | 0 | 0 |
| Concentration (mg/l) | 0 | 220 | 110[a] |

[a]Equivalent dosage of carbon dioxide into reactor based on flow rate of water through reactor.

TABLE 2

Water Quality of Example 1.

| Process stream | (9) |
|---|---|
| Description | Calcium bi-carbonate solution S2 |
| Alkalinity (mg/l as $CaCO_3$) | 220 |
| Hardness (mg/l as $CaCO_3$) | 214 |
| pH | 7.4 |
| Temperature [° C.] | 21.5 |
| Turbidity [NTU] | 0.1 |

In comparison to patent application EP 2 623 467 A1, the above process using the installation according to the present invention has a much better energy efficiency. According to Table 4 of EP 2 623 467 A1, 35 l/h of permeate was produced in 4 different trials from a tubular membrane module (Microdyne-Module MD 063 TP 2N). The suspension in these trials was circulated through the tubular module at a rate of 3 200 l/h with 1.5 bar pressure to produce this permeate stream. The hydraulic energy required to produce this permeate was therefore:

Hydraulic energy (W)=$V \times \rho \times p$ where:
V=flow rate of fluid (m$^3$/s)
$\rho$=density of fluid (kg/m$^3$)
p=outlet static pressure of pump (kPa)
For the example from patent application EP 2 623 467 A1, with the following inputs:
V=3 200 l/h=8.8e-04 m$^3$/s
p=1 000 kg/m$^3$ (for water without any other details)
p=1.5 bar=150 kPa
W=8.888e-04×1 000×150=133 W
This produced an average of 54 l/h permeate, and therefore the power consumption per cubic metre of permeate produced can be calculated as:

Power/cubic meter=0.133 kW÷0.035 m$^3$/h=3.8 kW·h/m$^3$

Using an installation according to the present invention and as shown in FIG. 1, 1250 l/h=3.47e-04 m$^3$/s of permeate was produced with a pressure of 50 kPa.
The hydraulic energy is therefore calculated as:

Hydraulic energy (W)=$V \times \rho \times p$=3.47e-04×1 000× 50=17.4 W

This produced an average of 1 250 l/h permeate, and therefore the power consumption per cubic metre of permeate produced can be calculated as:

Power/cubic meter=0.0174 kW÷1.25 m$^3$/h=0.014 kW·h/m$^3$

Therefore the specific power consumption (power per cubic meter of permeate produced) is over 270 times less with the present invention than that of the patent application EP 2 623 467 A1.
The $CO_2$ efficiency according to tests with the inventive installation shown in FIG. 1 and described by EP 2 623 467 A1 is calculated as:

(Free $CO_2$ in water+$CO_2$ dosed)/molecular weight of $CO_2$:(Final Alkalinity−Initial Alkalinity)/molecular weight of $CaCO_3$=(2+110)/44.01 g/mol: (220−12)/100.08 g/mol=2.54:2.08=1.22:1

Figure 2:
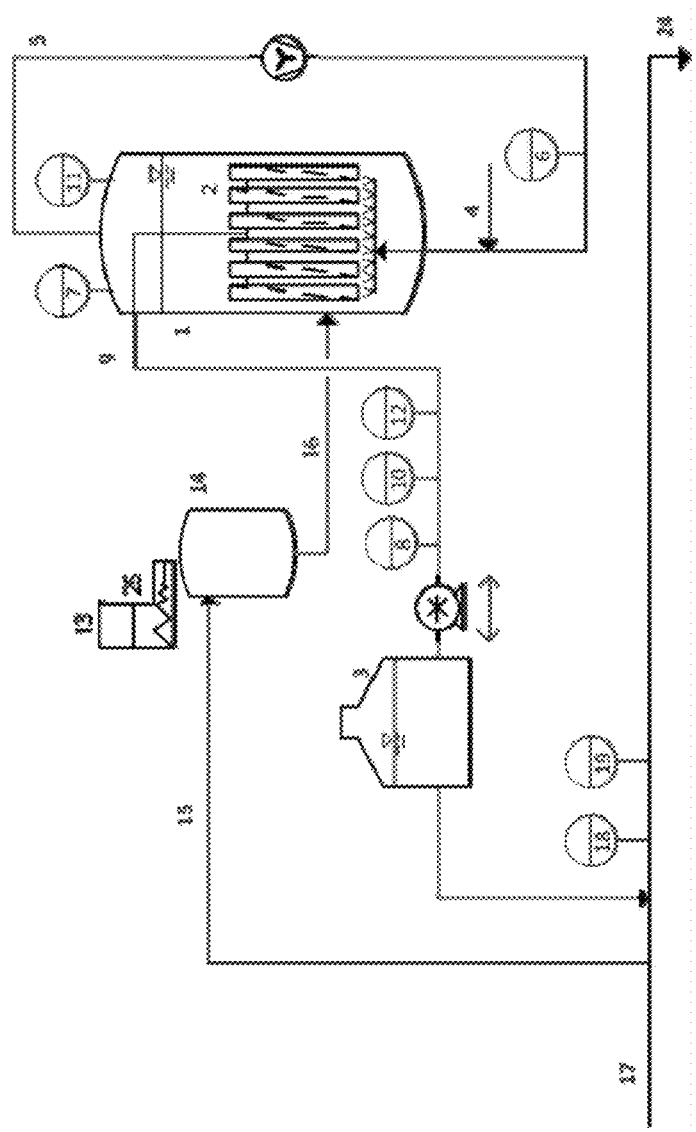
FIG. 2 refers to an installation being suitable for carrying out the mineralization process according to the present invention.

The $CO_2$ efficiency according to tests performed with an installation according to patent application EP 2 623 467 A1 was shown to be:
110/44.01 g/mol:170/100.08 g/mol=2.5:1.7=1.47:1
Inventive Installation—Preparation and Dosing of Aqueous Solution of Calcium Bi-Carbonate to Increase the Mineral and Alkalinity Content of a Desalinated Water
A general process flow sheet of one installation according to the present invention is shown in FIG. 2. The installation comprises a reactor tank (1) with a submerged membrane (2) of 50 m$^2$ inside, a product storage tank (3), a calcium carbonate storage silo (13) with dosing screw feeder and a vessel for preparing a suspension of the calcium carbonate (14).

A calcium hydrogen carbonate solution is produced in an aqueous solution S2 (9) and dosed into the main process flow (17) to increase the mineral content and alkalinity of the main process flow.
The feed water was obtained from reverse osmosis system, producing water of the following water specification:
Sodium: <1 mg/l
Chloride: <2 mg/l
Calcium: 8 mg/l
Magnesium: <1 mg/l
Alkalinity: 12 mg/l (as $CaCO_3$)
° dH: 1.12
pH: 6.9
Conductivity: 24 µS/cm
A calcium hydrogen carbonate solution can be produced in a side process flow line using the above mentioned installation in the following manner: Reactor tank (1) is originally filled with a calcium carbonate suspension of 5.0 wt.-% to a defined volume that covers the submerged membrane's (2) surface measured by level measurement (11) in the reactor tank (1). A blower starts recirculating air volume (5) from the top of the reactor tank (1) to diffusers located at the bottom of the submerged membranes (2) to ensure a homogenous suspension is maintained within the reactor (1) and to provide some cleaning effect for the membranes. The air volume (5) is recirculated at a rate of around 200 times per h. A controlled quantity of carbon dioxide is added in the air stream at e.g. position (4). Carbon dioxide loaded recirculation air passes over the submerged membranes (2) from the bottom to the top of the reactor creating turbulence, and carbon dioxide passes from the air stream to the calcium carbonate suspension increasing the amount of dissolved carbon dioxide within the suspension. The reaction between the calcium carbonate and the dissolved carbon dioxide allows the formation of a calcium hydrogen carbonate solution within the reactor tank. At the same time, calcium carbonate is added to the vessel (14) from the storage silo (13) for the preparation of a calcium carbonate suspension within the vessel (14). A loss-in-weight screw feeder is used to accurately measure the quantity of calcium carbonate added. Water is also added to the vessel (14) and a mixer used to create a homogenous suspension of known solids content. The suspension of micronized calcium carbonate (16) is then transferred to the reactor tank (1) at a rate equal to the amount of calcium carbonate that is dissolved through reaction with the carbon dioxide, so that the total amount of undissolved calcium carbonate within the reactor tank (1) remains constant. An aqueous solution S2 (9) of filtrated permeate as clear concentrated calcium hydrogen carbonate solution is used to add the calcium and bicarbonate to the main process flow (17) via a bi-directional dosing pump. A product storage tank (3) was used as a buffer also for backwashing sequence every 10 min.
Start-Up Pilot Unit
Natural calcium carbonate powder (Millicarb® from Omya International, Orgon France, $d_{50}$=3 µm) was used as the starting material in the pilot plant. Reactor tank (1) was filled with 900 l of prepared 5 wt.-% calcium carbonate powder suspension, executed by level measurement (11) in reactor tank (1). Recirculation air stream (5) fan started with 10 m$^3$/h for regeneration of membranes via turbulence. Overpressure of airflow was measured by (6).

Example 2

To produce high loaded concentrate (~250 mg/l alkalinity) 99 g of carbon dioxide (4) was dosed to the recirculating air stream within 1 h. Continuous production was started at the end of the first hour recirculation time. During continuous production a suspension of 250 mg/l calcium carbonate (16) was added to reactor (1) to account for the continuous dissolution of calcium carbonate within the reactor tank (1). At the same time a clear aqueous solution S2 (9) was extracted through the submerged membranes with a concentration of 250 mg/l calcium bi-carbonate (measured as calcium carbonate) and discharged via bi-directional dosing pump through the product storage tank (3) in main stream (17). Both ratios—suspension of micronized calcium carbonate (16) and aqueous solution S2 (9)—were controlled by level measurement (11) in reactor tank (1) and flow measurement (10). Primary settings of ratios depend from achievable membrane flux rates and were measured as trans-membrane-pressure (8). Quality of aqueous solution S2 (9) was controlled by turbidity measurement (12) in the aqueous solution (9) and titrations. Quality of first blend was measured via pH (18), electrical conductivity (19) and titrations of the blended water stream.

The operating conditions and quality results are given in Table 3 and Table 4 below.

TABLE 3

Process streams of Example 2.

| | Process stream | | | | |
|---|---|---|---|---|---|
| | (15) | (16) | (9) | (5) | (17) |
| Description | Raw water side process flow | Calcium carbonate suspension | Calcium bi-carbonate solution S2 | Recirculation air | Main process flow |
| Flow rate (l/h) | 1 250 | 1 250 | 1 250 | 20 000 | 3 750 |
| Solids content (wt.-%) | 0 | 0.025 | 0 | 0 | 0 |
| Concentration (mg/l) | 0 | 0 | 220 | 110[a] | 20 |

[a]Equivalent dosage of carbon dioxide into reactor based on flow rate of water through reactor.

TABLE 4

Water Quality Results of Example 2.

| Process stream | (9) | (24) |
|---|---|---|
| Description: | Calcium bi-carbonate solution S2 | Final water |
| Alkalinity (mg/l as $CaCO_3$) | 220 | 81 |
| Hardness (mg/l as $CaCO_3$) | 214 | 85 |
| pH | 7.4 | 7.25 |
| Temperature [° C.] | 21.5 | 21 |
| Turbidity [NTU] | 0.1 | 0 |

Figure 3:
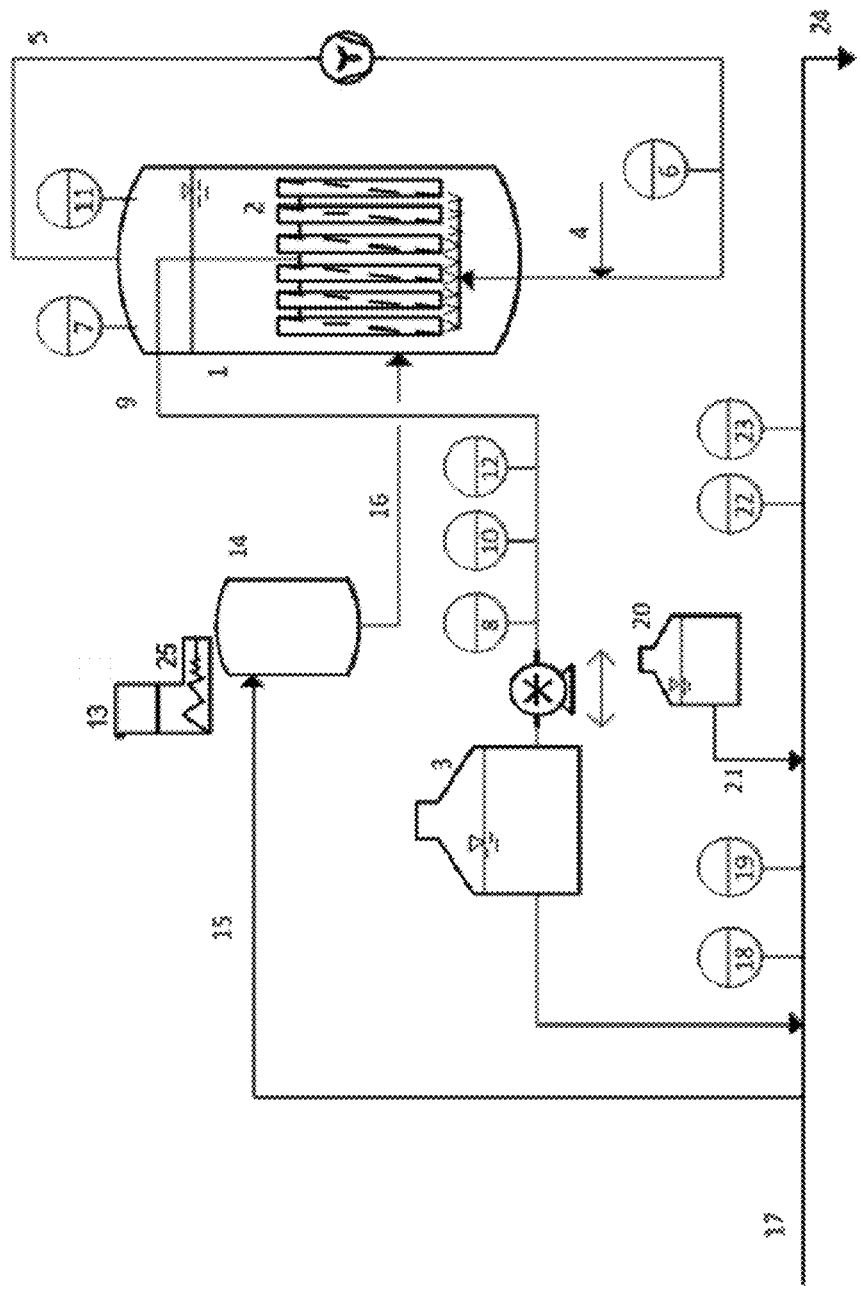
FIG. 3 refers to an installation being suitable for carrying out the mineralization with pH adjustment process according to the present invention.
Figure 4:
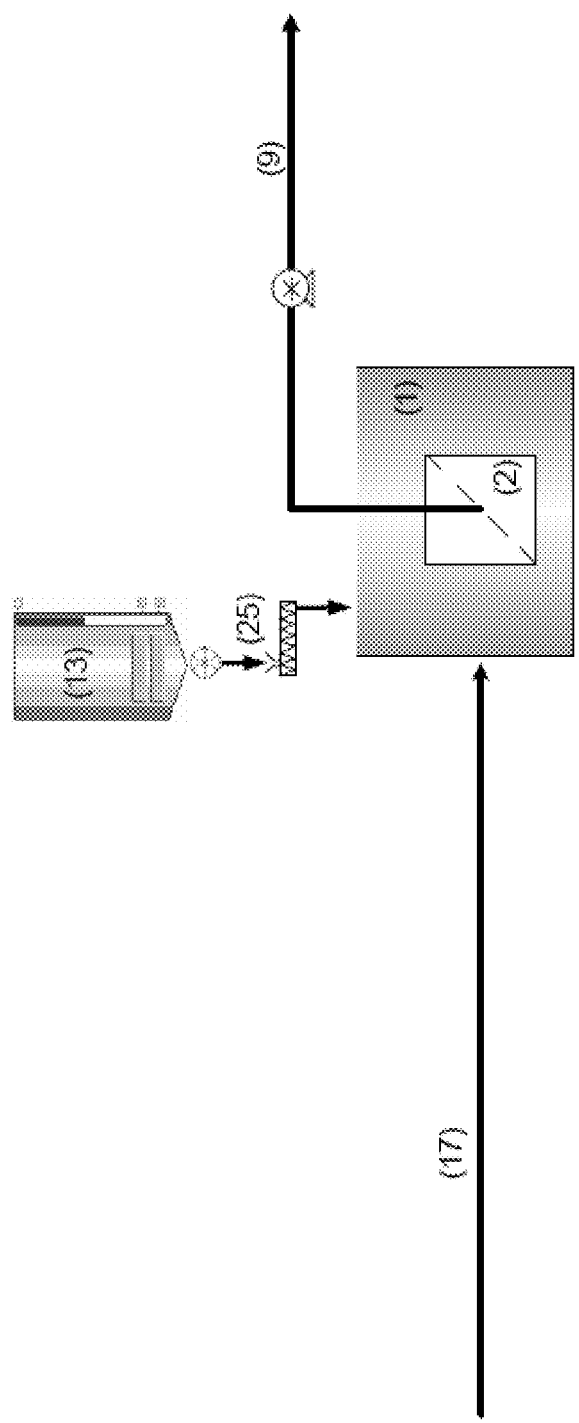
FIG. 4 refers to a schematic illustration of an installation comprising a main process flow line (17) only and wherein the dosing unit for dosing calcium carbonate is connected to the container (1) comprising the submerged membrane module (2).
Figure 5:
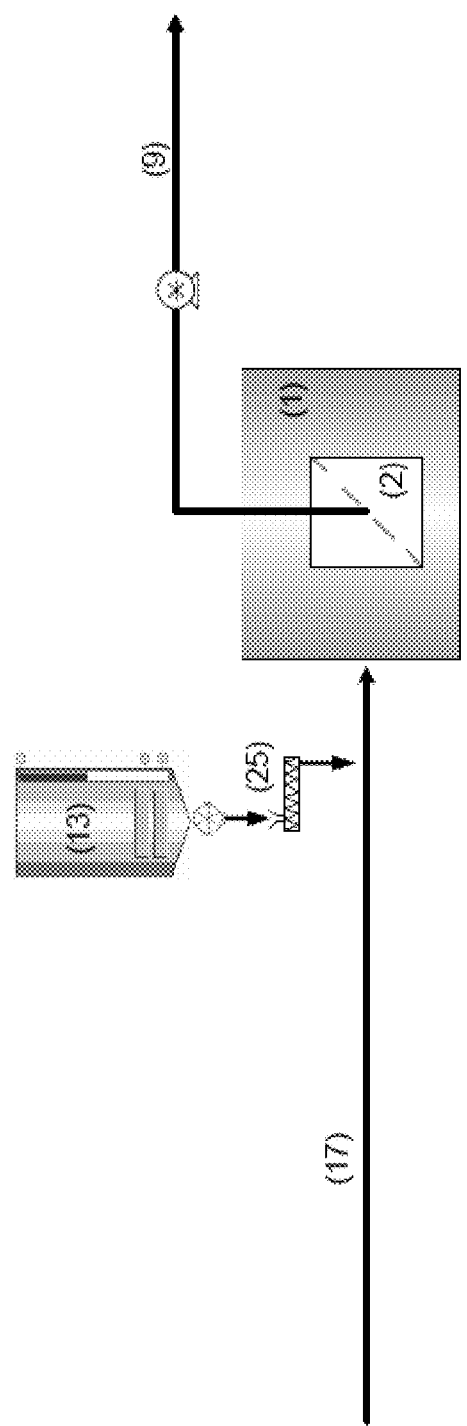
FIG. 5 refers to a schematic illustration of an installation comprising a main process flow line (17) only and wherein the dosing unit is configured such that the calcium carbonate is directly dosed into the main process flow line (17).
Figure 6:
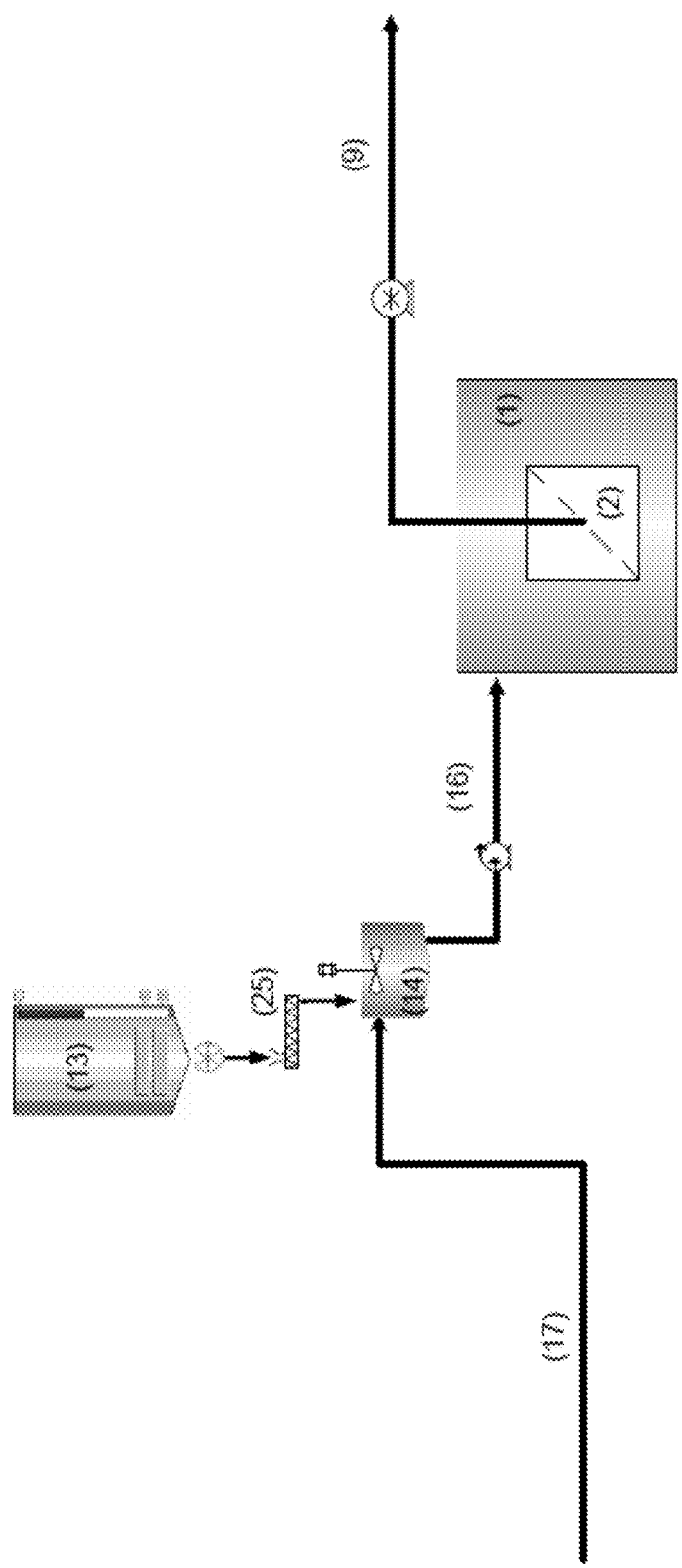
FIG. 6 refers to a schematic illustration of an installation comprising a main process flow line (17) only and wherein the dosing unit for dosing calcium carbonate is connected to the vessel for preparing a suspension of calcium carbonate (14).
Figure 7:
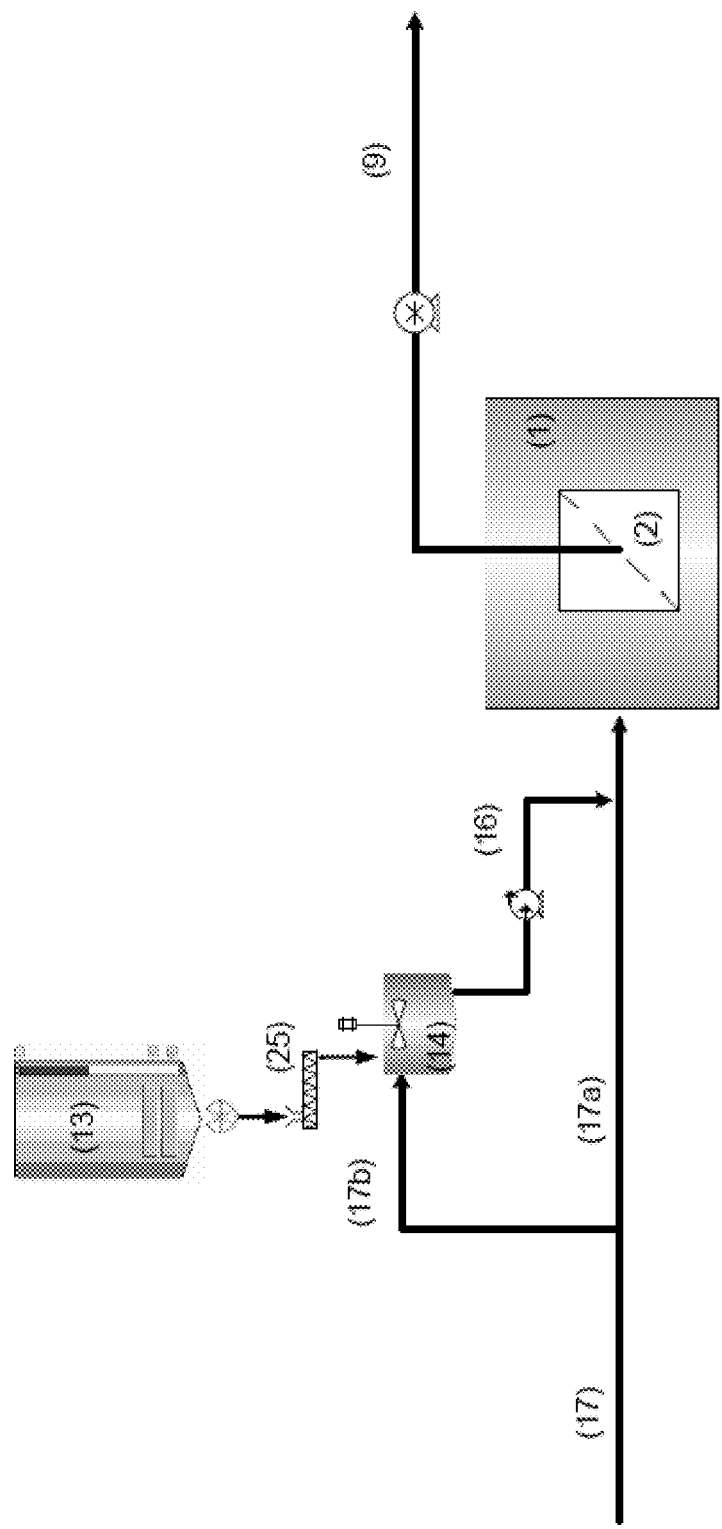
FIG. 7 refers to a schematic illustration of an installation comprising a main branch of the main process flow line (17a) and one side branch of the main process flow line (17b) wherein the dosing unit for dosing calcium carbonate is connected to the vessel for preparing a suspension of calcium carbonate (14) which is located in the side branch of the main process flow line (17b).
Figure 8:
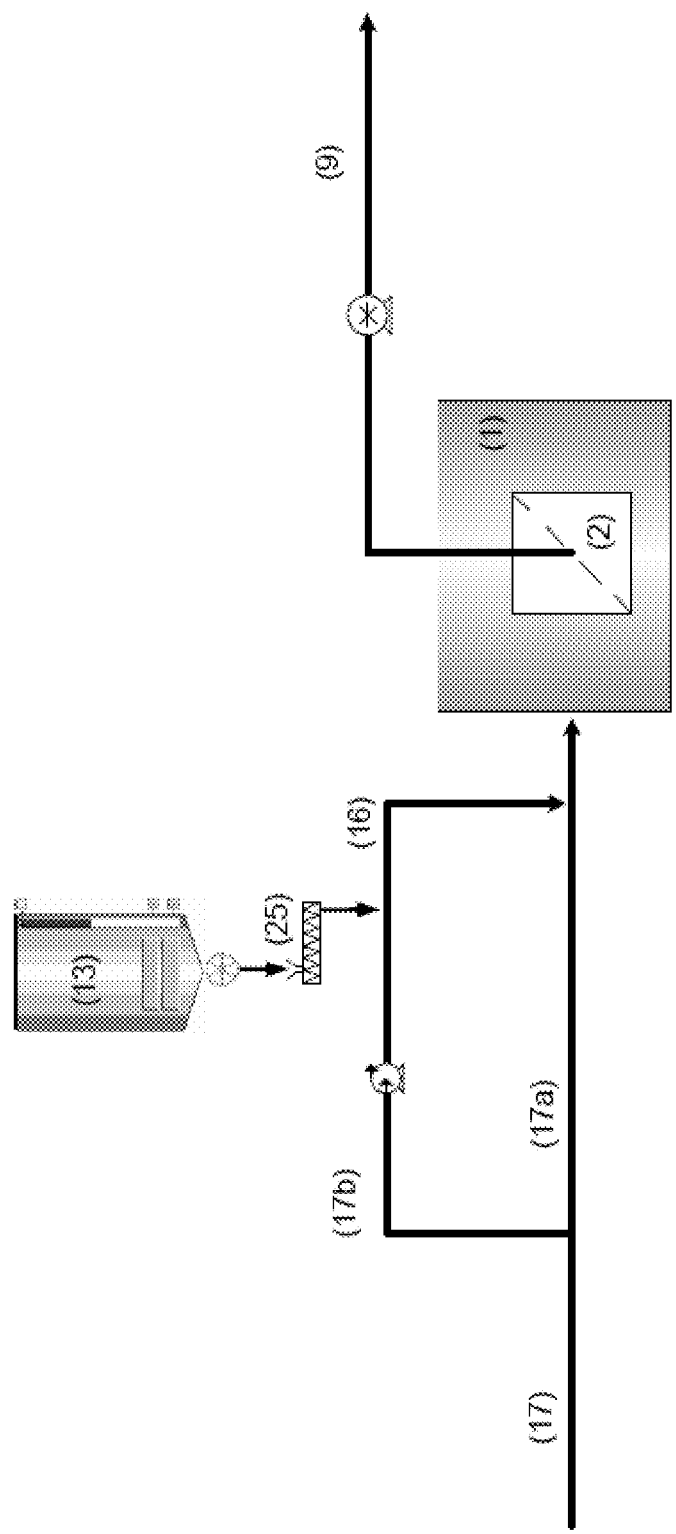
FIG. 8 refers to a schematic illustration of an installation comprising a main branch of the main process flow line (17a) and one side branch of the main process flow line (17b), wherein the dosing unit is configured such that the calcium carbonate is directly dosed into the side branch of the main process flow line (17b).
Figure 9:
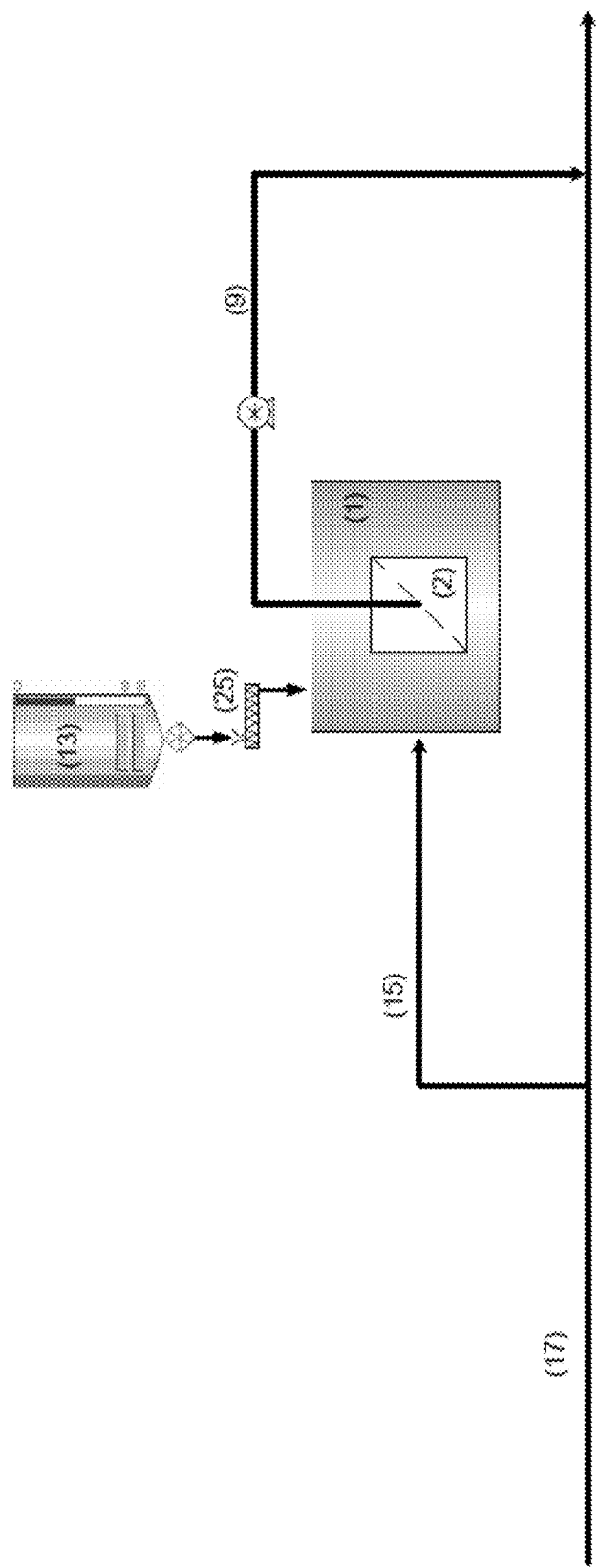
FIG. 9 refers to a schematic illustration of an installation comprising a main process flow line (17) and a side process flow line (15), wherein the dosing unit for dosing calcium carbonate is connected to the container (1) comprising the submerged membrane module (2) which is located in the side process flow line (15).
Figure 10:
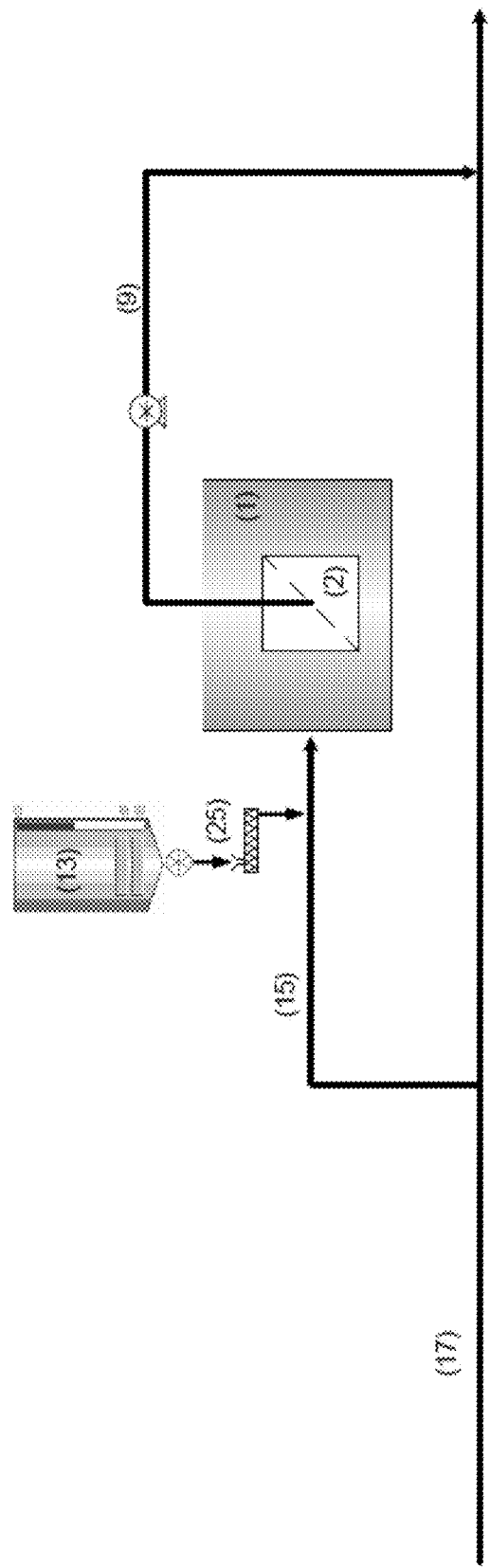
FIG. 10 refers to a schematic illustration of an installation comprising a main process flow line (17) and a side process flow line (15), wherein the container (1) comprising the submerged membrane module (2) is located in the side process flow line (15) and the dosing unit is configured such that the calcium carbonate is directly dosed into the side process flow line (15).
Figure 11:
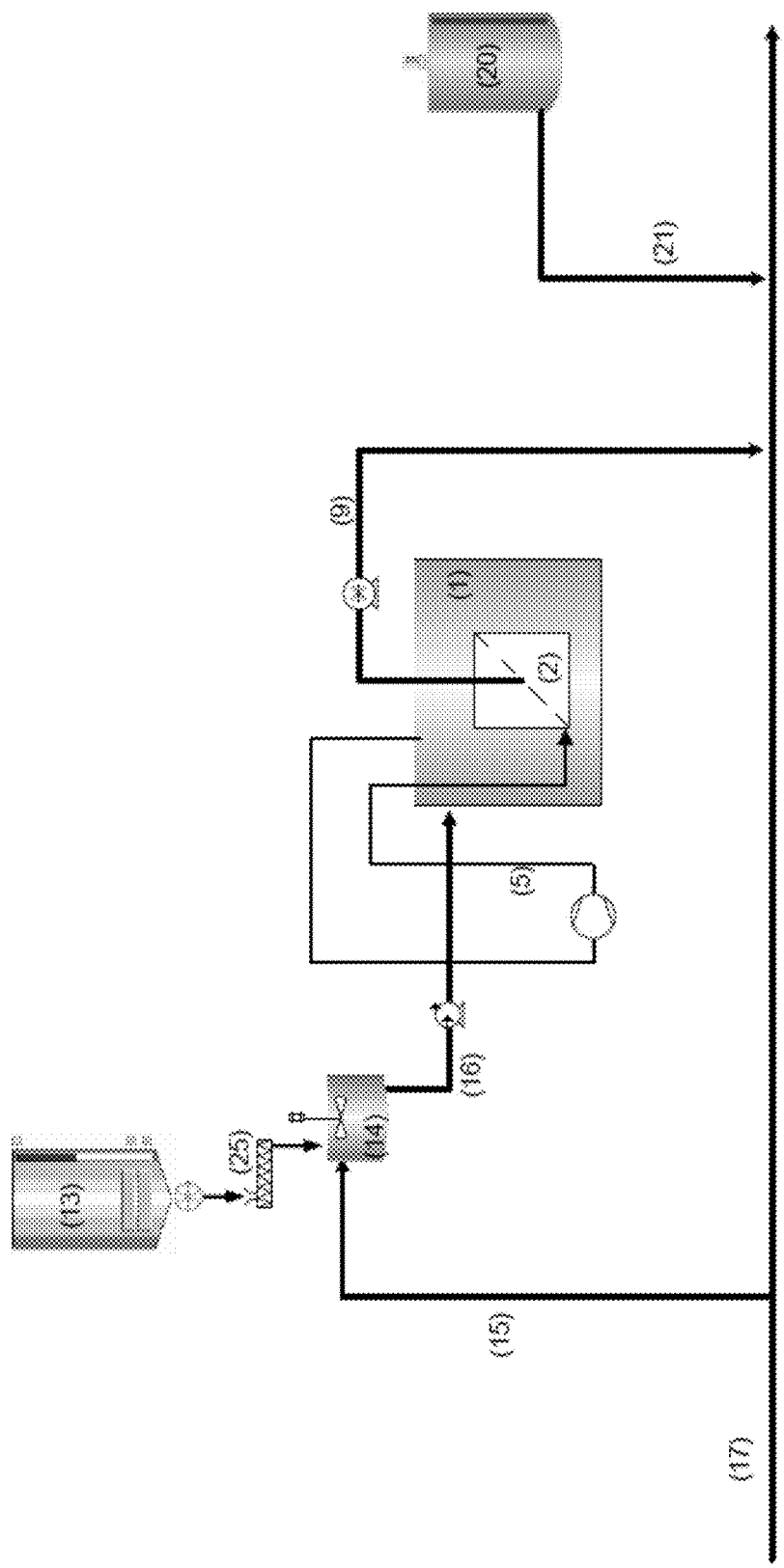
FIG. 11 refers to a schematic illustration of an installation comprising a main process flow line (17) and a side process flow line (15), wherein the container (1) comprising the submerged membrane module (2) and recirculation air (5) is located in the side process flow line (15) and the dosing unit for dosing calcium carbonate is connected to the vessel for preparing a suspension of calcium carbonate (14) which is located in the side process flow line (15). The illustration further shows the base dosing means for the $Ca(OH)_2$ dosing (21).
Figure 12:
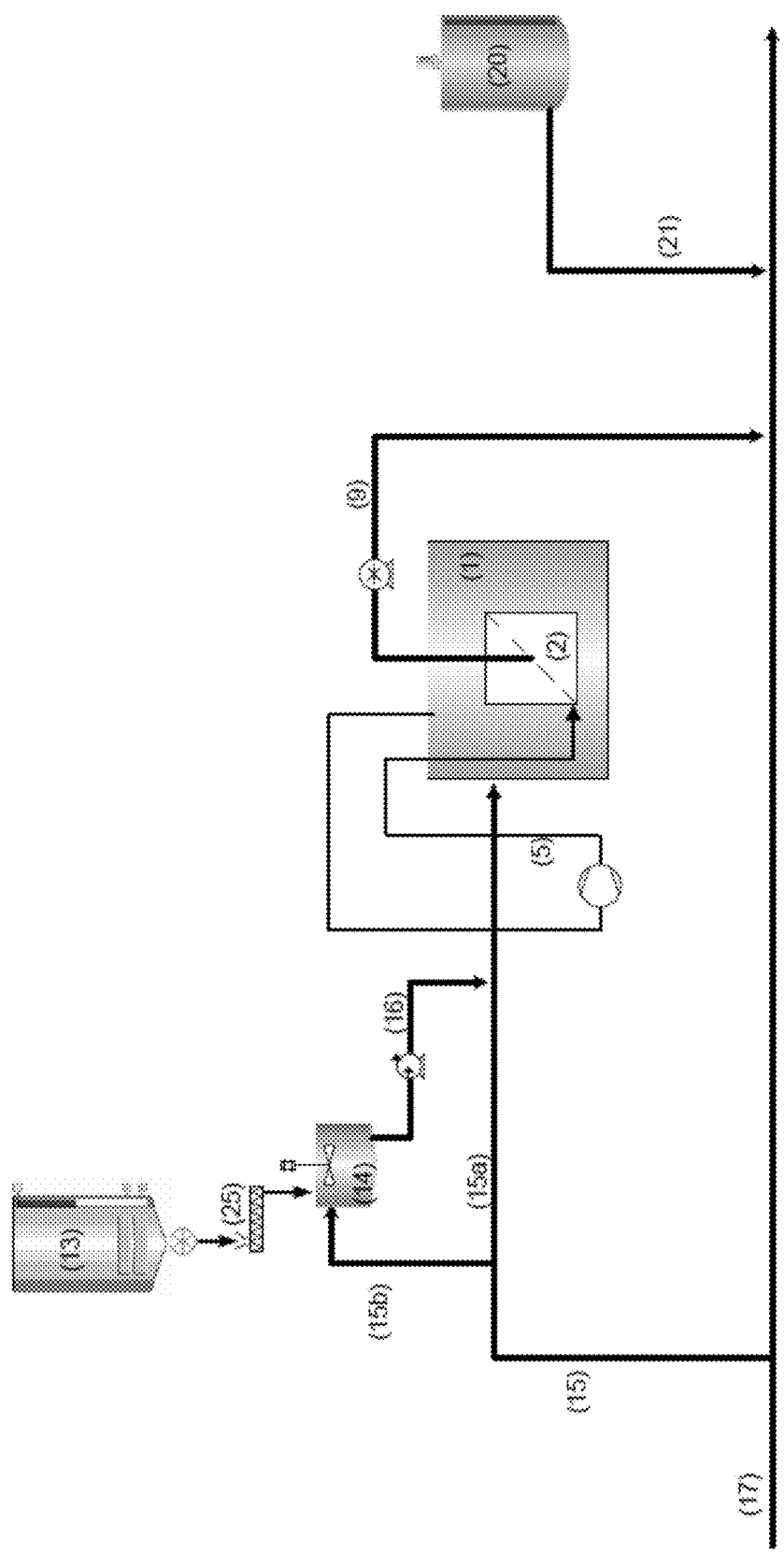
FIG. 12 refers to a schematic illustration of an installation comprising a main process flow line (17) a main branch of the side process flow line (15a) and a side branch of the side process flow line (15b), wherein the dosing unit for dosing calcium carbonate is connected to a vessel for preparing a suspension of calcium carbonate (14) which is located in the side branch of the side process flow line (15b). The illustration further shows the container (1) comprising the submerged membrane module (2) and recirculation air (5)

Inventive Installation—Preparation and Dosing of Aqueous Solution of Calcium Bi-Carbonate Followed by pH Adjustment, to Increase the Mineral and Alkalinity Content of a Desalinated Water and Stable it with Respect to its Saturation Index A general process flow sheet of one installation according to the present invention is shown in FIG. 3. The installation comprises a reactor tank (1) with a submerged membrane (2) of 50 m² inside, a product storage tank (3), a calcium carbonate storage silo (13) with dosing screw feeder and a vessel for preparing a suspension of the calcium carbonate (14) and a calcium hydroxide storage tank (20) and dosing system.

A calcium hydrogen carbonate solution is produced in an aqueous solution S2 (9) and dosed into the main process flow (17) to increase the mineral content and alkalinity of the main process flow (17). A calcium hydroxide suspension at 5.0 wt.-% and of high purity is dosed (21) in the main process flow (17) after the dosing of the calcium hydrogen carbonate solution to create the desired final water quality of the final treated water stream (24).

Feed water is provided in all process flows, the feed water was obtained from reverse osmosis system, producing water of the following water specification:

Sodium: <1 mg/l
Chloride: <2 mg/l
Calcium: 8 mg/l
Magnesium: <1 mg/l
Alkalinity: 12 mg/l (as $CaCO_3$)
° dH: 1.12
pH: 6.9
Conductivity 24 µS/cm A calcium hydrogen carbonate solution can be produced in a side process flow line using the above mentioned installation in the following manner: Reactor tank (1) is originally filled with a calcium carbonate suspension of 5.0 wt.-% at to a defined volume to that covers the submerged membrane's (2) surface measured by level measurement (11) in reactor tank (1). A blower starts recirculating air volume (5) from the top of reactor tank (1) to diffusers located at the bottom of the submerged membranes (2) to ensure a homogenous suspension is maintained within the reactor tank (1) and provide some cleaning effect for the submerged membranes (2). Volume is recirculated at a rate of around 200 times per h. A controlled quantity of carbon dioxide (4) is added in the air stream. Carbon dioxide loaded recirculation air passes over the submerged membranes (2) from the bottom to the top of the reactor tank (1) creating turbulence, and carbon dioxide passes from the air stream to the calcium carbonate suspension increasing the amount of dissolved carbon dioxide within the suspension. The reaction between the calcium carbonate and the dissolved carbon dioxide allows the formation of calcium hydrogen carbonate solution within the reactor tank (1). At the same time, calcium carbonate is added to the vessel (14) from the storage silo (13) for the preparation of a calcium carbonate suspension within the vessel (14). A loss-in-weight screw feeder is used to accurately measure the quantity of calcium carbonate added. Water is also added to the tank and a mixer used to create a homogenous suspension of known solids content. The suspension of micronized calcium carbonate (16) is then transferred to the reactor tank (1) at a rate equal to the amount of calcium carbonate that is dissolved through reaction with the carbon dioxide, so that the total amount of undissolved calcium carbonate within the reactor tank (1) remains constant. An aqueous solution S2 (9) of filtrated permeate as clear concentrated calcium hydrogen carbonate solution is used to add the calcium and bicarbonate to the main process flow (17) via a bi-directional dosing pump. A product storage tank (3) was used as a buffer also for the backwashing sequence every 10 minutes. A second dosing pump was used to add the calcium hydroxide suspension at e.g. position (21) stored in a storage tank (20) to the main process flow (17).

Start-Up Pilot Unit

Natural calcium carbonate powder (Millicarb® from Omya International, Orgon France, $d_{50}=3$ µm) and a calcium hydroxide suspension (Schäferkalk, Precal 72, 20 wt.-% concentration in water) have been used as starting materials in a pilot plant. The Schäferkalk product (Precal 72) is a highly reactive 20 wt.-% calcium hydroxide suspension, for effective pumping it has been diluted to 5 wt.-% (21) and directly dosed into the final treated water stream (24). Reactor tank (1) was filled with 900 l of prepared 5 wt.-% calcium carbonate powder suspension, executed by level measurement (11) in reactor tank 1. Recirculation air stream (5) fan started with 10 m³/h for regeneration of membranes via turbulence. Overpressure of airflow was measured by (6).

Example 3

To produce high loaded concentrate (~250 mg/l alkalinity) 99 g of carbon dioxide (4) was dosed to recirculating air stream within 1 h. Continuous production was started at the end of the first hour recirculation time. During continuous production a suspension of 250 mg/l micronized calcium carbonate (16) was added to reactor tank (1) to account for the continuous dissolution of calcium carbonate within the reactor tank (1). At the same time a clear aqueous solution (9) was extracted through the submerged membranes (2) with a concentration of 250 mg/l calcium bi-carbonate (measured as calcium carbonate) and discharged via bi-directional dosing pump through the product storage tank (3) in main process flow (17). Both ratios—suspension of micronized calcium carbonate (16) and aqueous solution S2 (9)—were controlled by level measurement (11) in reactor tank (1) and flow measurement (10) of the aqueous solution S2 (9). Primary settings of ratios depend from achievable membrane flux rates and were measured as trans-membrane-pressure (8). Quality of aqueous solution (9) was controlled by turbidity measurement (12) and titrations. Quality of first blend was measured via pH (18), electrical conductivity (19) and titrations. To reach the desired final water quality with a Langelier Saturation Index of 0 for the final treated stream (24), the calcium hydroxide suspension (21) from tank (20) was dosed into the final treated water stream (24) also.

The operating conditions and water quality results are given in Table 5 and Table 6 below.

TABLE 5

Process streams of Example 3.

| Process stream | (15) | (16) | (9) | (21) | (5) | (17) |
|---|---|---|---|---|---|---|
| Description | Raw water side process flow | Calcium carbonate suspension | Calcium bi-carbonate solution S2 | Calcium hydroxide suspension | Recirculation air | Main process flow |
| Flow rate (l/h) | 1 250 | 1 250 | 1 250 | 0.42 | 20 000 | 3 750 |
| Solids content (%) | 0 | 0.025 | 0 | 5 | 0 | 0 |
| Concentration (mg/l) | 0 | 0 | 220 | 50 000 | 110[a] | 20 |

[a]Equivalent dosage of carbon dioxide into reactor based on flow rate of water through reactor

TABLE 6

Water Quality Results of Example 3:

| Process stream | (9) | (24) |
|---|---|---|
| Description: | Calcium bi-carbonate solution S2 | Final water |
| Alkalinity (mg/l as $CaCO_3$) | 220 | 88.5 |
| Hardness (mg/l as $CaCO_3$) | 214 | 92.5 |
| pH | 7.4 | 7.95 |
| Temperature [° C.] | 21.5 | 21 |
| Turbidity [NTU] | 0.1 | 0 |

Example 4: Use of Ceramic Membrane within Membrane Calcite Reactor (MCR) in Accordance with FIG. 1

4.1 Equipment

The following equipment was used for the tests:

"Membrane Calcite Reactor" (MCR) consisting of:
  Rectangular PVC reactor with maximum volume of 75 l and required connections,
  Cembrane SiCFM-0828 Silicon carbide submerged membrane module with 0.828 m² of membrane area installed inside reactor.
  Cembrane SiCFM-0828 Silicon carbide is a ceramic membrane. A method for producing ceramic membranes suitable for the invention are described e.g. in EP 3 009 182 A1. The content of the patent application EP 3 009 182 A1 is thus hereby incorporated by reference.
  Lid to seal reactor,
  Instrumentation for level control
  Instrumentation for pressure monitoring—in particular Trans-Membrane Pressure (TMP),
Blower system configured such that it forms a blower recirculation loop, consisting of:
  Blower operated by variable speed drive,
  Feed pipework to blower connected from top of reactor (connected to lid)
  Discharge pipework connected to diffuser manifold at bottom of submerged membrane unit,
Permeate pump to extract concentrate solution through membrane, consisting of the following:
  Pump operated by variable speed drive,
  Flow meter to measure flow rate,
Carbon dioxide dosing system, consisting of:
  Carbon dioxide bottle
  Pressure regulator to decrease pressure from bottle at 50 bar to 5 bar
  Mass flow meter and control valve to regulate and measure the dosing of carbon dioxide
  Dosing connection to blower discharge pipework Slurry Make-Down (SMD) system, consisting of:
  Slurry make-down (SMD) tank with electric mixer and tank level instrumentation,
  Feed water supply to tank, controlled to maintain level within tank
  Loss-in-weight dosing feed system to accurately add required amount of micronized calcium carbonate to the SMD tank,
  Hopper supplying micronized calcium carbonate to the loss-in-weight feeder,
  Slurry feed pump to dose calcium carbonate suspension produced in SMD tank to the 75 l reactor,
  Dosing hose connecting slurry feed pump and 1800 l reactor
Control system that performs the following functions:
  Controls the permeate pump to achieve the requested flow rate
  Controls the slurry feed pump to ensure the reactor level remains constant
  Runs the blower at the requested speed.

4.2 Procedure:

The following procedure was used to run the trials:
1. The SMD tank was filled with water and calcium carbonate dosed into the tank to produce a suspension S1 as per the settings provided below.
2. The SMD control was placed into automatic mode so that water would be continually replenished in the SMD tank when suspension was withdrawn from the tank, and calcium carbonate would be continuously dosed to ensure a consistent suspension was generated of concentration provided in Section 4.3.
3. 50 l of the suspension containing 1% of micronized calcium carbonate S1 were supplied into the 75 l reactor (Membrane Calcite Reactor). During the process, the reactor was replenished with a suspension of micronized calcium carbonate S1 to ensure a continuous process.
4. The lid of the reactor was closed and a tight seal was ensured.
5. The blower was energized to run, keeping the micronized calcium carbonate in suspension S1.
6. Carbon dioxide was dosed into the blower recirculation loop, as per the settings provided in Section 4.3.
7. The permeate pump was operated at a set speed to provide the required flow rate and extract a clear solution S2 from the reactor tank. The pump speeds was varied to achieve a range of flow rates as per the settings provided in Section 4.3.
8. The slurry feed pump was operated at a set speed to ensure that the level within the reactor tanks remains constant.
9. Samples of the concentrated solution S2 extracted by the permeate pump were analysed for the following water qualities by the methods described above:
  a. Alkalinity (in mg/l)
  b. Total hardness (in mg/l)
  c. Acidity (as mg/l $CO_2$)
  d. pH, conductivity, temperature & turbidity The operational settings for each trial were recorded, including flow rate, TMP, temperature.

4.3 Test Settings

The following test settings were used during the trials:

TABLE 7

Test settings

| Trial No. | Suspension volume MCR (l) | Blower speed (Nm³/hr) | SMD $CaCO_3$ conc. (mg/l) | Permeate flow rate (l/hr) | $CO_2$ dose rate (mg/l) | $CO_2$ dose rate (g/min) |
|---|---|---|---|---|---|---|
| 1a | 50 | 7.5 | 160 | 325 | 76 | 0.40 |
| 1b | 50 | 7.5 | 160 | 325 | 84 | 0.45 |
| 2a | 50 | 7.5 | 160 | 420 | 64 | 0.45 |
| 2b | 50 | 7.5 | 160 | 420 | 78 | 0.55 |
| 3a | 50 | 7.5 | 160 | 500 | 90 | 0.75 |
| 3b | 50 | 7.5 | 160 | 500 | 85 | 0.70 |
| 4a | 50 | 7.5 | 160 | 600 | 85 | 0.85 |
| 4b | 50 | 7.5 | 160 | 600 | 80 | 0.80 |
| 4c | 50 | 7.5 | 160 | 600 | 75 | 0.75 |
| 5a | 50 | 7.5 | 160 | 700 | 82 | 0.95 |

4.4 Measured Results

TABLE 8

Measured results

| Test # | Suspension Volume MCR [l] | $CO_2$ conc to dose [mg/L] | $CO_2$ dose [g/min] | Concentrate S2 flow rate [L/hr] | Filter flux [lmh] | Contact time [min] | TMP [mbar] | Permeability [LMH/bar] | pH [—] | Cond. [µS/cm] | Turb [NTU] | T [° C.] | Alkalinity [mg/L $CaCO_3$] | Hardness [mg/L $CaCO_3$] | Acidity [mg/L $CO_2$] | Alkalinity Est. [mg/L $CaCO_3$] |
|---|---|---|---|---|---|---|---|---|---|---|---|---|---|---|---|---|
| 1a | 50 | 76 | 0.4 | 325 | 393 | 9 | 275 | 1339 | 7.2 | 295 | 0.0 | 17.2 | 151.6 | 153.0 | 17.6 | 144.9 |
| 1a | 50 | 76 | 0.4 | 325 | 393 | 9 | 288 | 1266 | 7.2 | 304 | 0.0 | 16.8 | 156.1 | 155.0 | 22.9 | 149.7 |
| 1b | 50 | 84 | 0.45 | 325 | 393 | 9 | 297 | 1205 | 7.1 | 314 | 0.0 | 16.0 | 161.1 | 158.0 | 25.1 | 155.1 |
| 1b | 50 | 84 | 0.45 | 325 | 393 | 9 | 294 | 1200 | 7.2 | 314 | 0.0 | 15.4 | 160.1 | 156.0 | 24.2 | 155.1 |
| 1b | 50 | 84 | 0.45 | 325 | 393 | 9 | 305 | 1157 | 7.1 | 313 | 0.0 | 15.4 | 158.6 | 160.0 | 22.0 | 154.6 |
| 1b | 50 | 84 | 0.45 | 325 | 393 | 9 | 308 | 1145 | 7.1 | 310 | 0.0 | 15.4 | 157.6 | 154.0 | 22.9 | 153.0 |
| 2a | 50 | 64 | 0.45 | 420 | 507 | 7 | 339 | 1364 | 7.1 | 273 | 0.0 | 16.0 | 141.6 | 155.0 | 18.5 | 127.0 |
| 2a | 50 | 64 | 0.45 | 420 | 507 | 7 | 338 | 1352 | 7.1 | 257 | 0.0 | 15.5 | 133.6 | 145.0 | 16.3 | 118.4 |
| 2b | 50 | 78 | 0.55 | 420 | 507 | 7 | 362 | 1242 | 7.0 | 278 | 0.0 | 14.8 | 139.1 | 148.0 | 22.0 | 129.7 |
| 2b | 50 | 78 | 0.55 | 420 | 507 | 7 | 385 | 1167 | 7.0 | 282 | 0.0 | 14.8 | 145.1 | 148.0 | 22.9 | 131.9 |
| 2b | 50 | 78 | 0.55 | 420 | 507 | 7 | 392 | 1139 | 7.0 | 265 | 0.0 | 14.5 | 138.6 | 154.0 | 21.1 | 122.7 |
| 2b | 50 | 78 | 0.55 | 420 | 507 | 7 | 407 | 1094 | 7.0 | 265 | 0.0 | 14.4 | 139.6 | 153.0 | 22.0 | 122.7 |
| 2b | 50 | 78 | 0.55 | 420 | 507 | 7 | 409 | 1091 | 7.0 | 271 | 0.0 | 14.5 | 140.1 | 143.0 | 22.9 | 125.9 |
| 3a | 50 | 90 | 0.75 | 500 | 604 | 6 | 312 | 1786 | 7.0 | 367 | 0.0 | 16.5 | 151.1 | 165.0 | 24.2 | 149.7 |
| 3a | 50 | 90 | 0.75 | 500 | 604 | 6 | 330 | 1649 | 7.0 | 312 | 0.0 | 15.5 | 158.6 | 163.0 | 26.0 | 147.6 |
| 3a | 50 | 90 | 0.75 | 500 | 604 | 6 | 341 | 1577 | 7.0 | 320 | 0.0 | 15.0 | 161.1 | 165.0 | 26.0 | 151.9 |
| 3a | 50 | 90 | 0.75 | 500 | 604 | 6 | 355 | 1514 | 7.0 | 317 | 0.0 | 15.0 | 161.6 | 165.0 | 26.0 | 150.3 |

TABLE 8-continued

Measured results

| Test # | Suspension Volume MCR [l] | $CO_2$ conc to dose [mg/L] | $CO_2$ dose [g/min] | Concentrate S2 flow rate [L/hr] | Filter flux [lmh] | Contact time [min] | TMP [mbar] | Permeability [LMH/bar] | pH [—] | Cond. [μS/cm] | Turb [NTU] | T [° C.] | Alkalinity [mg/L $CaCO_3$] | Hardness [mg/L $CaCO_3$] | Acidity [mg/L $CO_2$] | Alkalinity Est. [mg/L $CaCO_3$] |
|---|---|---|---|---|---|---|---|---|---|---|---|---|---|---|---|---|
| 3b | 50 | 85 | 0.70 | 500 | 604 | 6 | 361 | 1482 | 7.0 | 309 | 0.0 | 14.8 | 156.6 | 158.0 | 24.2 | 145.9 |
| 3b | 50 | 85 | 0.70 | 500 | 604 | 6 | 423 | 1265 | 7.1 | 325 | 0.0 | 14.8 | 163.6 | 170.0 | 24.6 | 154.6 |
| 3b | 50 | 85 | 0.70 | 500 | 604 | 6 | 415 | 1292 | 7.0 | 328 | 0.0 | 14.9 | 164.1 | 167.0 | 24.2 | 156.2 |
| 3b | 50 | 85 | 0.70 | 500 | 604 | 6 | 435 | 1227 | 7.1 | 344 | 0.0 | 14.7 | 169.6 | 174.0 | 22.0 | 164.9 |
| 4a | 50 | 85 | 0.85 | 600 | 725 | 5 | 372 | 1759 | 6.9 | 277 | 0.0 | 15.6 | 138.1 | 152.0 | 25.1 | 130.8 |
| 4a | 50 | 85 | 0.85 | 600 | 725 | 5 | 376 | 1720 | 6.9 | 291 | 0.0 | 15.1 | 145.1 | 158.0 | 25.1 | 138.4 |
| 4a | 50 | 85 | 0.85 | 600 | 725 | 5 | 474 | 1358 | 6.9 | 286 | 0.0 | 14.9 | 143.6 | 147.0 | 26.4 | 135.7 |
| 4b | 50 | 80 | 0.80 | 600 | 725 | 5 | 488 | 1313 | 6.9 | 273 | 0.0 | 14.7 | 136.6 | 151.0 | 29.9 | 128.6 |
| 4b | 50 | 80 | 0.80 | 600 | 725 | 5 | 459 | 1389 | 6.9 | 280 | 0.0 | 14.5 | 140.1 | 147.0 | 26.4 | 132.4 |
| 4b | 50 | 80 | 0.80 | 600 | 725 | 5 | 483 | 1320 | 6.8 | 250 | 0.0 | 14.5 | 134.1 | 125.0 | 27.7 | 116.2 |
| 4b | 50 | 80 | 0.80 | 600 | 725 | 5 | 461 | 1383 | 6.9 | 267 | 0.0 | 14.5 | 131.6 | 138.0 | 25.1 | 125.4 |
| 4b | 50 | 80 | 0.80 | 600 | 725 | 5 | 494 | 1312 | 6.8 | 312 | 0.0 | 15.2 | 137.6 | 140.0 | 29.5 | 139.5 |
| 4c | 50 | 75 | 0.75 | 600 | 725 | 5 | 482 | 1307 | 6.8 | 267 | 0.0 | 14.0 | 132.1 | 135.0 | 26.4 | 115.1 |
| 4c | 50 | 75 | 0.75 | 600 | 725 | 5 | 432 | 1472 | 6.9 | 268 | 0.0 | 14.4 | 135.1 | 136.0 | 26.0 | 115.7 |
| 4c | 50 | 75 | 0.75 | 600 | 725 | 5 | 500 | 1272 | 6.9 | 264 | 0.0 | 14.4 | 135.1 | 137.0 | 23.8 | 113.5 |
| 4c | 50 | 75 | 0.75 | 600 | 725 | 5 | 507 | 1255 | 7.0 | 260 | 0.0 | 14.4 | 135.1 | 135.0 | 24.2 | 111.4 |
| 4c | 50 | 80 | 0.80 | 600 | 725 | 5 | 526 | 1209 | 7.0 | 270 | 0.0 | 14.4 | 137.6 | 135.0 | 23.8 | 116.8 |
| 4c | 50 | 80 | 0.80 | 600 | 725 | 5 | 500 | 1269 | 7.0 | 271 | 0.0 | 14.3 | 136.6 | 138.0 | 23.8 | 117.3 |
| 4c | 50 | 80 | 0.80 | 600 | 725 | 5 | 413 | 1540 | 7.0 | 291 | 0.0 | 14.4 | 147.6 | 147.0 | 25.5 | 128.1 |
| 4c | 50 | 80 | 0.80 | 600 | 725 | 5 | 426 | 1486 | 6.9 | 270 | 0.0 | 14.2 | 136.6 | 138.0 | 26.4 | 116.8 |
| 5a | 50 | 82 | 0.95 | 700 | 845 | 4 | 429 | 1759 | 6.9 | 272 | 0.0 | 15.1 | 137.1 | 139.0 | 23.8 | 123.8 |
| 5a | 50 | 82 | 0.95 | 700 | 845 | 4 | 536 | 1388 | 6.9 | 275 | 0.0 | 14.5 | 136.1 | 154.0 | 26.4 | 125.4 |
| 5a | 50 | 82 | 0.95 | 700 | 845 | 4 | 475 | 1540 | 6.9 | 275 | 0.0 | 13.8 | 137.1 | 149.0 | 26.8 | 125.4 |
| 5a | 50 | 82 | 0.95 | 700 | 845 | 4 | 531 | 1371 | 6.9 | 266 | 0.0 | 13.6 | 134.1 | 138.0 | 26.4 | 120.5 |

The results provided in Table 8 demonstrate that high flux rates can be achieved by using the ceramic membranes as the at least one submerged membrane module (up to 845 lmh) and, moreover, these high flux rates were achieved by stable and almost constant Trans-Membrane Pressure (TMP) values. The flux rates are normalized over the TMP (together with the temperature) to generate a permeability value for the membranes. The permeability value for the ceramic membranes as the at least one submerged membrane module are fairly constant over the whole range of flux rates. As can be seen from Table 8, the permeability of the ceramic membranes as the at least one submerged membrane module in this process are in the range of 1100-1790 lmh/bar.

Furthermore, the use of the submerged membrane module results in a lower specific energy consumption for the operation of the blower.

A ceramic membrane tower of 79 m² membrane area, has a maximum blower air flow rate of 150 Nm³/hr. Using the results of the tests that show that a stable flux rate of 800 lmh is achievable, then such a tower can produce a flow rate of 800 lmh×79 m²=63.2 m³/hr. Normalising this flow rate over the maximum blower air flow rate, then it can be shown that the specific flow rate (flow rate per Nm³/hr of blower air) is 0.421 m³/hr of permeate per Nm³/hr of blower air.

In addition to the above benefits, the trials demonstrated that very low contact times can be achieved by using the at least one submerged membrane module—as low as 4 minutes.

CONCLUSION

Trials with ceramic membranes as the at least one submerged membrane module within a remineralization process have demonstrated that much higher flux rates can be achieved during stable operation. Higher flux rates result in reduced specific energy consumption from the blower and reduced contact times for the process which reduces the overall footprint of the process, which is of major importance for large scale desalination processes. Furthermore, the increased permeability of the membrane module can provide a reduced pressure drop across the membrane module and hence reduced energy consumption for applications where energy costs are of major importance.

The invention claimed is:

1. An installation for the preparation of an aqueous solution comprising at least one earth alkali hydrogen carbonate, the installation comprising
   a) a process flow line providing water,
   b) at least one dosing unit being suitable for dosing at least one earth alkali carbonate-comprising material into at least a part of the water provided in the process flow line for obtaining an aqueous suspension comprising at least one earth alkali carbonate-comprising material,
   c) at least one means being suitable for dosing $CO_2$ or an acid having a $pK_a$-value<5 into at least a part of the water provided in the process flow line or the aqueous suspension comprising at least one earth alkali carbonate-comprising material for obtaining an aqueous suspension S1 comprising at least one earth alkali hydrogen carbonate, and
   d) a container being connected to the at least one process flow line by an inlet, wherein the container
      i) is configured such that at least one submerged membrane module is located in the container for filtering at least a part of the aqueous suspension S1 by passing the aqueous suspension S1 through the at least one submerged membrane module in order to obtain an aqueous solution S2 comprising at least one earth alkali hydrogen carbonate, and
      ii) comprises at least one outlet for releasing the aqueous solution S2 comprising at least one earth alkali hydrogen carbonate from the container;
   wherein the container comprises recirculating means which are configured such that air or process fluid is withdrawn from the container via a retentate side of the at least one submerged membrane module and recirculated across at least a part of the surface of the at least one submerged membrane module from the bottom to top direction of the at least one submerged membrane module and/or container; and wherein the at least one outlet is connected to a permeate side of the at least one submerged membrane module.

2. The installation according to claim 1, wherein the at least one dosing unit is
  i) connected to a storage container for solid material, and/or
  ii) configured such that the at least one earth alkali carbonate-comprising material is directly dosed into the water provided in the process flow line, or
  iii) connected to a vessel suitable for preparing an aqueous suspension comprising at least one earth alkali carbonate-comprising material, wherein the vessel is connected to the process flow line by an inlet for introducing the water provided in the process flow line and an outlet for releasing the aqueous suspension comprising at least one earth alkali carbonate-comprising material, or
  iv) connected to the container.

3. The installation according to claim 1, wherein the container is a reactor tank.

4. The installation according to claim 1, wherein the at least one means c) is
  i) configured such that the $CO_2$ or acid having a $pK_a$-value<5 is directly dosed into the water provided in the process flow line, or
  ii) connected to a vessel suitable for preparing an aqueous suspension S1 comprising at least one earth alkali hydrogen carbonate, wherein the vessel is connected to the process flow line by an inlet for introducing the water provided in the process flow line and an outlet for releasing the aqueous suspension S1 comprising at least one earth alkali hydrogen carbonate, or
  iii) connected to the container.

5. The installation according to claim 1, wherein the at least one submerged membrane module
  a) has a pore size of <1 μm, and/or
  b) has a flux of ≥10 l/(m²h), and/or
  c) is of a ceramic, polymer, or other synthetic material.

6. The installation according to claim 1, wherein the at least one process flow line comprises one or more main process flow line(s).

7. The installation according to claim 6, wherein the at least one process flow line comprises two main process flow lines.

8. The installation according to claim 7, wherein the at least one dosing unit is located in the side branch of the main process flow line.

9. The installation according to claim 7, wherein the main branch of the main process flow line and the side branch of the main process flow line are configured such that they are merged together upstream of the container.

10. The installation according to claim 1, wherein the at least one process flow line comprises one main process flow line and one or more side process flow line(s).

11. The installation according to claim 10, wherein the at least one process flow line comprises one main process flow line and two side process flow lines.

12. The installation according to claim 10, wherein the at least one dosing unit is located in the side process flow line or, if present, in the side branch of the side process flow line.

13. The installation according to claim 10, wherein the main branch of the side process flow line and the side branch of the side process flow line are configured such that they are merged together upstream of the container.

14. The installation according to claim 10, wherein the main process flow line and the side process flow line are configured such that they are merged together downstream of the container.

15. The installation according to claim 1, wherein the installation further comprises base dosing means downstream of the container for introducing a base to the aqueous solution S2 comprising at least one earth alkali hydrogen carbonate.

16. The installation according to claim 6, wherein the installation further comprises base dosing means for introducing a base to the main process flow line downstream of where the side process flow line and main process flow line are merged together.

17. The installation according to claim 3, wherein the reactor tank is a sealed reactor tank.

18. The installation according to claim 1, wherein the at least one submerged membrane module has a pore size of <0.1 μm.

19. An installation for the preparation of an aqueous solution comprising at least one earth alkali hydrogen carbonate, the installation comprising
  a) a process flow line providing water,
  b) at least one dosing unit being suitable for dosing at least one earth alkali carbonate-comprising material into at least a part of the water provided in the process flow line for obtaining an aqueous suspension comprising at least one earth alkali carbonate-comprising material,
  c) at least one means being suitable for dosing $CO_2$ or an acid having a $pK_a$-value<5 into at least a part of the water provided in the process flow line or the aqueous suspension comprising at least one earth alkali carbonate-comprising material for obtaining an aqueous suspension S1 comprising at least one earth alkali hydrogen carbonate, and
  d) a container being connected to the at least one process flow line by an inlet, wherein the container
    i) is configured such that at least one submerged membrane module is located in the container for filtering at least a part of the aqueous suspension S1 by passing the aqueous suspension S1 through the at least one submerged membrane module in order to obtain an aqueous solution S2 comprising at least one earth alkali hydrogen carbonate, and
    ii) comprises at least one outlet for releasing the aqueous solution S2 comprising at least one earth alkali hydrogen carbonate from the container;
  wherein the container comprises recirculating means which are configured such that air or process fluid is withdrawn from the container via a retentate side of the at least one submerged membrane module and recirculated across at least a part of the at least one submerged membrane module from the bottom to the top direction of the at least one submerged membrane module and/or the container;
  wherein the recirculating means are configured to recirculate the air or process fluid directly from an upper recirculation outlet of the container to a location within the container at or below the at least one submerged membrane module or a lower recirculation inlet of the container.

* * * * *